US011840650B2

(12) United States Patent
Shiraishi et al.

(10) Patent No.: US 11,840,650 B2
(45) Date of Patent: Dec. 12, 2023

(54) BLACK SHEET AND BLACK ADHESIVE TAPE

(71) Applicants: DIC Corporation, Tokyo (JP); Sun Chemical Corporation, Parsippany, NJ (US)

(72) Inventors: Nana Shiraishi, Kitaadachi-gun (JP); Katsuaki Imai, Kitaadachi-gun (JP); Akira Yamakami, Kitaadachi-gun (JP); Bo Sun, Bardonia, NY (US); Jerome Moyer, West New York, NJ (US); Philippe Schottland, Sparta, NJ (US)

(73) Assignees: DIC CORPORATION, Tokyo (JP); SUN CHEMICAL CORPORATION, Parsippany, NJ (US)

( * ) Notice: Subject to any disclaimer, the term of this patent is extended or adjusted under 35 U.S.C. 154(b) by 896 days.

(21) Appl. No.: 16/636,797

(22) PCT Filed: Aug. 29, 2018

(86) PCT No.: PCT/JP2018/032027
§ 371 (c)(1),
(2) Date: Feb. 5, 2020

(87) PCT Pub. No.: WO2019/044930
PCT Pub. Date: Mar. 7, 2019

(65) Prior Publication Data
US 2020/0376801 A1 Dec. 3, 2020

Related U.S. Application Data

(60) Provisional application No. 62/669,576, filed on May 10, 2018, provisional application No. 62/553,370, filed on Sep. 1, 2017.

(51) Int. Cl.
| C09J 7/29 | (2018.01) |
| C09J 7/38 | (2018.01) |
| C09D 11/037 | (2014.01) |
| C09D 11/106 | (2014.01) |
| C09J 11/04 | (2006.01) |
| B32B 7/023 | (2019.01) |
| C08K 3/013 | (2018.01) |
| C08K 3/22 | (2006.01) |
| C09D 11/033 | (2014.01) |
| B32B 7/06 | (2019.01) |
| B32B 7/12 | (2006.01) |

(52) U.S. Cl.
CPC ............ *C09J 7/29* (2018.01); *B32B 7/023* (2019.01); *C09D 11/037* (2013.01); *C09D 11/106* (2013.01); *C09J 7/38* (2018.01); *C09J 11/04* (2013.01); *B32B 7/06* (2013.01); *B32B 7/12* (2013.01); *B32B 2307/402* (2013.01); *B32B 2307/408* (2013.01); *B32B 2307/4023* (2013.01); *B32B 2307/416* (2013.01); *B32B 2405/00* (2013.01); *B32B 2457/00* (2013.01); *C08K 3/013* (2018.01); *C08K 3/22* (2013.01); *C09D 11/033* (2013.01); *C09J 2301/302* (2020.08); *C09J 2301/41* (2020.08); *C09J 2431/006* (2013.01); *C09J 2467/006* (2013.01)

(58) Field of Classification Search
None
See application file for complete search history.

(56) References Cited

U.S. PATENT DOCUMENTS

| 7,241,500 B2 | 7/2007 | Shiao et al. |
| 9,056,988 B2 | 6/2015 | Decker et al. |
| 2004/0206904 A1 | 10/2004 | Djordjevic |
| 2016/0333202 A1 | 11/2016 | Okamoto et al. |

FOREIGN PATENT DOCUMENTS

| CN | 103282593 A | 9/2013 | |
| EP | 469 414 A2 | 10/2004 | |
| JP | 2005153471 A * | 6/2005 | |
| JP | 2007-103813 A | 4/2007 | |
| JP | 2010-116549 A | 5/2010 | |
| JP | 2011-155175 A | 8/2011 | |
| JP | 5251809 B2 | 7/2013 | |
| JP | 2013-203965 A | 10/2013 | |
| JP | 2013-227173 A | 11/2013 | |
| JP | 2014-169432 A | 9/2014 | |
| JP | 2014-233844 A | 12/2014 | |
| JP | 2015-170664 A | 9/2015 | |
| JP | 2016-72270 A | 5/2016 | |
| JP | 2016-74226 A | 5/2016 | |
| JP | 2017-177374 A | 10/2017 | |
| JP | 2017-185782 A | 10/2017 | |
| RU | 2 531 174 C2 | 10/2014 | |
| TW | 201631078 A * | 9/2016 | ............ C09J 109/06 |

(Continued)

OTHER PUBLICATIONS

Kamimori et al., JP-2005153471-A, Jun. 16, 2005 (machine translation) (Year: 2005).*
Akiyama et al., TW-201631078-A, Sep. 1, 2016 (machine translation) (Year: 2016).*
Yamanaka et al., WO-2016052641-A1, Apr. 7, 2016 (machine translation) (Year: 2016).*
Office Action dated Oct. 8, 2021, issued in counterpart CN Application No. 201880055207.5, with English Translation of Search Report. (7 pages).
International Search Report dated Nov. 27, 2018, issued in counterpart International Application No. PCT/JP2018/032027, w/English translation (4 pages).
Notice of Allowance dated Mar. 22, 2022, issued in counterpart JP Application No. 2019-210842, with English Translation. (4 pages).

Primary Examiner — Cheng Yuan Huang
(74) Attorney, Agent, or Firm — WHDA, LLP

(57) ABSTRACT

A black sheet (1) includes a laminate of a base sheet (11) and an infrared reflecting layer (12). The CIE color values (L*, a*, b*) and the infrared reflectance R/[%] at a wavelength of 850 nm are within the following respective ranges. $18 \leq L^* \leq 36$, $-3 \leq a^* \leq 3$, $-3 \leq b^* \leq 3$, $12 \leq R$

12 Claims, 13 Drawing Sheets

(56) References Cited

FOREIGN PATENT DOCUMENTS

| WO | WO-2016052641 A1 | * | 4/2016 | ............. B32B 27/00 |
| WO | 2016/146349 A1 | | 9/2016 | |

* cited by examiner

BLACK SHEET AND BLACK ADHESIVE TAPE

This application claims priority based on Application Ser. No. 62/553,370 filed in United States on Sep. 1, 2017, and claims priority based on Application Ser. No. 62/669,576 filed in United States on May 10, 2018, the contents of which are incorporated herein.

TECHNICAL FIELD

The present invention relates to a black sheet and a black adhesive tape.

BACKGROUND ART

Small electronic terminals such as an electronic notebook, a cellular phone, PHS, and the like use, as a cooling method, heat dissipation by a heat dissipation sheet such as a graphite sheet or the like (Patent Literature 1). Small electronic terminals also use a magnetic sheet containing a resin sheet compounded with a soft magnetic metal powder for suppressing radiation noise and an insulation sheet for electrical insulation of an electronic component (Patent Literatures 2 and 3).

In addition, these functional sheets for electronic components, such as a heat dissipation sheet, a magnetic sheet, an insulation sheet, and the like, are preferably used for black-colored adhesive tapes in view of shielding and shading. The usual black-colored adhesive tapes are generally colored with carbon black and absorb near-infrared light.

CITATION LIST

Patent Literature

PTL 1: Japanese Unexamined Patent Application Publication No. 2013-203965
PTL 2: Japanese Unexamined Patent Application Publication No. 2016-072270
PTL 3: Japanese Unexamined Patent Application Publication No. 2016-074226

SUMMARY OF INVENTION

Technical Problem

However, a functional sheet with a usual black adhesive tape attached thereto may be requested to be attached at a position or overlapped with the position near a plurality of black electronic components each including a functional sheet with a black adhesive tape attached thereto in a small electronic terminal. Therefore, difficulty may occur in discriminating the plurality of components of the same black color by visible light. Although discrimination by infrared light can be made by using a black infrared light-reflecting coating film, there has not been known a commercial infrared light-reflecting coating film suitable for printing on an adhesive tape applicable to a small electronic component.

The present invention has been achieved in consideration of the situation, and an object of the present invention is to provide a black sheet which can be used for discriminating between a plurality of adhesive tapes of the same black color by using an infrared light source and an infrared camera and also provide a black adhesive tape.

Solution to Problem

As a result of earnest research for solving the problem described above, the inventors found that a black sheet reflecting near-infrared light has the same color tone as that of a usual black adhesive tape and can be discriminated by using infrared light. That is, the present invention is as follows.

[1] A black sheet including a laminate of a base sheet and an infrared reflecting layer, wherein the CIE color values (L*, a*, b*) and the infrared reflectance R/[%] at a wavelength of 850 nm are within the following respective ranges.

$18 \leq L^* \cdot 36$ $-3 \leq a^* \leq 3$ $-3 \leq b^* \leq 3$ $12 \leq R$

[2] The black sheet described above in [1], wherein the glossiness Gu measured at a set angle of 60° according to JIS Z 8741 is within the following range.

$0 \leq Gu \leq 10$

[3] The black sheet described above in [1] or [2], wherein the thickness of the base sheet is 0.5 to 100 μm, and the thickness of the infrared reflecting layer is 1 to 10 μm.

[4] The black sheet described above in any one of [1] to [3], wherein the infrared reflecting layer contains an inorganic black pigment or an organic black pigment.

[5] The black sheet described above in any one of [1] to [4], wherein the infrared reflecting layer includes a laminate of a black infrared reflecting layer and a white infrared reflecting layer.

[6] The black sheet described above in any one of [1] to [5], wherein a matte layer is further laminated.

[7] The black sheet described above in any one of [1] to [6], wherein the black sheet is used for adjusting the infrared reflectance of a functional sheet for an electronic component.

[8] The black sheet described above in [7], wherein the functional sheet is a heat dissipation sheet, a magnetic sheet, or an insulation sheet.

[9] A black adhesive tape including a laminate of the black sheet described above in any one of [1] to [8] and an adhesive layer.

[10] The black adhesive tape described above in [9], wherein the thickness of the adhesive layer is 1 to 50 μm.

Also, the present invention provides an infrared reflecting ink, a printed matter containing the ink, a method for forming an adhesive tape, a film containing an infrared reflecting pigment.

[11] An infrared reflecting printable ink containing the followings (a) to (e):
(a) 0 to 50% of an inorganic black pigment selected from the group consisting of chromium iron oxide, chromium iron nickel oxide, copper chromate, chromite, manganese ferrite, nickel manganese iron oxide, an infrared non-reflecting inorganic black pigment, and combination thereof;
(b) 0 to 30% of an inorganic color pigment selected from the group consisting of bismuth vanadate, chromium antimony titanate, chromium oxide, cobalt aluminate, cobalt chromate, cobalt chromium aluminate, cobalt lithium aluminate, cobalt titanate, iron chromate, iron chromium titanium, lead chromate, antimony manganese titanate, manganese titanate, nickel antimony titanate, nickel titanate, niobium tin pyrochlore, tin zinc, titanium oxide, zinc ferrite, zinc iron chromate, and an infrared non-reflecting inorganic color pigment;
(c) 1 to 35% of a resin;

(d) 5 to 65% of a solvent; and (e) 0 to 20% of rheological functional additives containing a non-triblock copolymer dispersant, a defoaming agent, a matte agent, an adhesion promoter, a wax, and a curing agent

[12] The ink described above in [11], wherein the ink is black and contains at least 1% of an inorganic black pigment.

[13] The ink described above in [11], wherein when a dried film of 0.15 to 5 μm is formed, the infrared reflectance R at a wavelength of 850 nm of is more than 5%.

[14] The ink described above in [11], wherein when a dried film of 0.15 to 5 μm is formed, the infrared reflectance R at a wavelength of 850 nm is more than 10%.

[15] The ink described above in [11], wherein when a dried film of 0.15 to 5 μm is formed, the infrared reflectance R at a wavelength of 850 nm is more than 20%.

[16] The ink described above in [11], wherein when a dried film of 0.15 to 5 μm is formed, the infrared reflectance R at a wavelength of 850 nm is more than 25%.

[17] The ink described above in any one of [11] to [16], wherein in the color coordinates, the L* value is 22.5 (±5), the a* value is 0 (±2), and the b* value is −1 (±2).

[18] The ink described above in any one of [11] to [17], wherein in the color coordinates, the L* value is 22.5 (±2.5), the a* value is 0 (±1), and the b* value is −1 (±1).

[19] The ink described above in [11], wherein the glossiness is ≤10.

[20] The ink described above in [11], wherein the glossiness is 2±2.

[21] The ink described above in [11], wherein the resin is selected from the group consisting of urethane, acrylic, vinyl, polyester, and cellulose resins, and combination thereof.

[22] The ink described above in [21], wherein the resin is a thermoplastic resin.

[23] The ink described above in [11], wherein the solvent is selected from the group consisting of ethanol, methanol, methyl acetate, n-propyl acetate, ethyl acetate, isopropyl acetate, isopropanol, acetone, methyl isoamyl ketone, n-butyl acetate, propylene glycol methyl ether acetate, and combination thereof.

[24] The ink described above in [11], wherein the ink has a low hue color having a L* value of 18 to 36 and any a* value and b* value in the color coordinates represented by CIE color values (L*, a*, b*).

[25] A printed matter containing the ink described above in any one of [11] to [24].

[26] The printed matter described above in [25], wherein the printed matter is an adhesive tape.

[27] A method for forming an adhesive tape, including printing the ink described above in any one of [11] to [24] on a substrate.

[28] A film containing an infrared reflecting pigment directly kneaded in the film.

[29] The film described above in [28], wherein at least a portion of the pigment is an inorganic black pigment selected from the group consisting of chromium iron oxide, chromium iron nickel oxide, copper chromate, chromium iron, manganese ferrite, nickel manganese iron oxide, an infrared non-reflecting inorganic black pigment, and combination thereof.

Advantageous Effects of Invention

According to the present invention, it is possible to provide a black sheet which can be used for discriminating between a plurality of adhesive tapes of the same black color and between a black adhesive tape and a black electronic component by using an infrared light source and an infrared camera, and also provide a black adhesive tape.

DESCRIPTION OF EMBODIMENTS

A black sheet and a black adhesive tape according to embodiments to which the present invention is applied are described in detail below.

First Embodiment

A black sheet according to this embodiment includes a laminate of a base sheet and an infrared reflecting layer, wherein the CIE color values (L*, a*, b*) and the infrared reflectance R/[%] at a wavelength of 850 nm are within the following respective ranges.

$$18 \leq L^* \leq 36$$

$$-3 \leq a^* \leq 3$$

$$-3 \leq b^* \leq 3$$

$$12 \leq R$$

The L* value of the black sheet is $18 \leq L^* \leq 36$, preferably $19 \leq L^* \leq 30$, and more preferably $20 \leq L^* \leq 25$.

The a* value of the black sheet is $-3 \leq a^* \leq 3$, preferably $-2 \leq a^* \leq 2$, and more preferably $-1 \leq a^* \leq 1$.

The b* value of the black sheet is $-3 \leq b^* \leq 3$, preferably $-2.5 \leq b^* \leq 1.5$, and more preferably $-2 \leq b^* \leq 0$.

The infrared reflectance R/[%] at a wavelength of 850 nm of the black sheet is $12 \leq R$, preferably $15 \leq R$, and most preferably 20 S R.

The black sheet according to the embodiment has the CIE color values (L*, a*, b*) and infrared reflectance R at a wavelength of 850 nm within the respective ranges described above, and when used in combination with a black adhesive tape colored with usual carbon black or a black electronic component colored with carbon black, both can be discriminated by using infrared light because of the same color tone, excellent designability, and different near-infrared reflection properties.

The CIE color values (L*, a*, b*) and the infrared reflectance R at a wavelength of 850 nm can be measured by measurement methods described later.

The black sheet preferably has the glossiness Gu within the following range, measured at a set angle of 60° according to JIS Z 8741.

$$0 \leq Gu \leq 10$$

The black sheet has the CIE color values (L*, a*, b*) and infrared reflectance R at a wavelength of 850 nm within the respective ranges described above, which are measured from at least one of the base sheet side and the infrared reflecting layer side.

Figure 13:
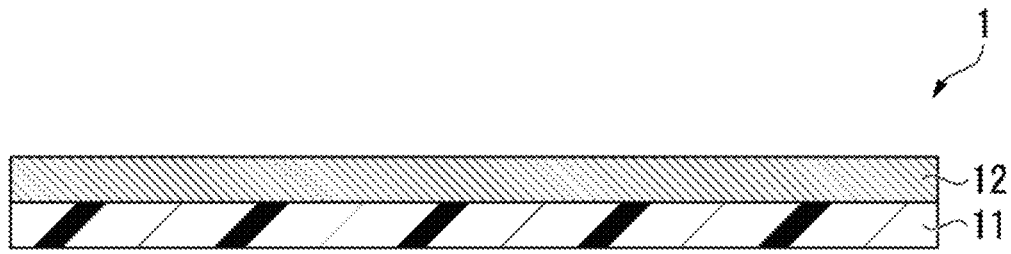
FIG. 13 is a schematic sectional view showing an example of a black sheet 1 according to a first embodiment.

FIG. 13 is a schematic sectional view showing an example of a black sheet 1 according to the first embodiment, in which a base sheet 11 and an infrared reflecting layer 12 are laminated. In the drawings after FIG. 13, the same constituent element as shown in the drawings described above are denoted by the same reference numeral as in the drawings described above, and the detailed description thereof is omitted.

The total thickness of the black sheet is preferably 1.5 to 100 μm, more preferably 3.5 to 40 μm, and particularly preferably 2.5 to 10.5 μm. Within the range, in the case of use for protection of a functional sheet for an electronic component, mechanical strength, thinness, and adhesive strength are easily simultaneously satisfied. The total thickness of the black sheet is the total thickness of the black sheet excluding the adhesive layer.

(Base Sheet)

Various resin sheets, resin films, resin tapes, and metals, and a composite film of a metal and a resin film can be appropriately applied as the base sheet used for the black sheet and the black adhesive tape of the present invention. Examples of the resin films include a polyester film, a polyethylene film, a polypropylene film, a polystyrene film, a polyimide film, and the like. Examples of the metals include a copper foil, an aluminum foil, a nickel foil, an iron foil, an alloy foil, and the like. The composite film of a metal and a resin film include is, for example, a laminate of the resin film and the metal. Among these, a polyester film and a polyimide film, which are excellent in strength and insulation, are preferred.

The thickness of the base sheet is 0.5 to 100 μm, preferably 1.5 to 30 μm, and most preferably 2 to 5 μm. Within the range, in the case of use for protection of a functional sheet for an electronic component, both mechanical strength and thinness are easily satisfied.

Also, the resin film may be mixed with any of various color pigments in order to impart shielding and reflection properties.

(Infrared Reflecting Layer)

The infrared reflecting layer used in the black sheet and the black adhesive tape of the present invention is a layer which adjusts the CIE color values (L*, a*, b*) and infrared reflectance R/[%] at a wavelength of 850 nm of the black sheet and the black adhesive tape within the respective predetermined ranges. These values can be adjusted by coating an ink described later.

The thickness of the infrared reflecting layer is preferably 1 to 10 μm, more preferably 1.5 to 6 μm, and most preferably 2 to 5 μm. Within the range, in the case of use for protection of a functional sheet for an electronic component, preferred CIE color values, infrared reflectance, and thinness are easily simultaneously satisfied.

The infrared reflecting layer preferably contains an inorganic black pigment or an organic black pigment. The infrared reflecting layer containing an inorganic black pigment can be formed as an infrared reflecting coating film by coating an ink containing an inorganic black pigment described below on the base sheet. The infrared reflecting layer containing an organic black pigment can be formed as an infrared reflecting coating film by coating an ink containing an organic black pigment described below on the base sheet.

(Ink Containing Inorganic Black Pigment)

The ink containing an inorganic oxide pigment is used for the infrared reflecting layer as a coating film which provides black color and near-infrared reflectance. The main infrared reflecting inorganic oxide material described in the specification of the present invention is an inorganic black pigment.

The inorganic black pigment is, for example, selected from the group consisting of chromium iron oxide, chromium iron nickel oxide, copper chromate, chromite, manganese ferrite, nickel manganese iron oxide, infrared non-reflecting inorganic black pigments, and combination thereof. The ink containing the inorganic black pigment is preferably an ink containing a chromium-based inorganic black pigment containing chromium. The black color is one of the colors with which it is most difficult to achieve the characteristic of absorbing visible light (390 to 700 nm) while reflecting light at a wavelength of 850 nm. Therefore, a black pigment which absorbs visible light and infrared light, for example, carbon black, is changed to a different pigment which absorbs visible light but reflects infrared light. By selecting a different pigment, an infrared non-reflecting material and an infrared reflecting material having the same color but different infrared reflectance values can be achieved. A color can be adjusted by adding another inorganic infrared reflecting pigment which changes the appearance of a visual spectrum along the dark color axis, the yellow-blue color axis, and the green-red color axis of the CIE color value (L*, a*, b*) spectrum. Such an inorganic color pigment is, for example, selected from the group consisting of bismuth vanadate, chromium antimony titanate, chromium oxide, cobalt aluminate, cobalt chromate, cobalt chromium aluminate, cobalt lithium aluminate, cobalt titanate, iron chromite, iron chromium titanium, lead chromate, antimony manganese titanate, manganese titanate, nickel antimony titanate, nickel titanate, niobium tin pyrochlore, tin zinc, titanium oxide, zinc ferrite, and zinc iron chromate.

Similarly, an infrared non-reflecting inorganic color pigment, dye, or organic pigment, which is nonreflective for near-infrared light, can also be preferably added together with the inorganic infrared reflecting pigment for adjusting a color. The amount of the infrared non-reflecting pigment contained is preferably not much, and the amount of use is preferably 20% or less, more preferably 15% or less, still more preferably 10% or less, and most preferably 5% or less of the total amount.

The selection of the resin and solvent influences the sedimentation and flow characteristics of an ink and is important for uniform printability on the base material. When there is compatibility between the solvent and the resin, a plurality of resins may be used. Also, one or more solvent systems may be selected. The compatibility between the resin and the solvent is required to be such that the resin is dissolved in the solvent system, and the solubility is maintained during printing. The resin used can be properly selected from known resins such as urethane-based, acrylic, vinyl, polyester-, and/or cellulose-based resins, and the like. These resins are required to be compatible with a solvent adaptable to gravure or flexographic printing or another similar printing method. The resin preferably has good adhesion to possible base materials, for example, plastic, a metal, and glass. Therefore, a thermoplastic polymer resin is more preferred than a thermosetting polymer resin. Also, the resin preferably does not absorb infrared light, particularly infrared light at 850±100 μm. The solvent used can be properly selected from known solvents such as ethanol, methanol, methyl acetate, n-propyl acetate, ethyl acetate, isopropyl acetate, isopropanol, acetone, methyl isoamyl ketone, n-butyl acetate, propylene glycol methyl ether (PM) acetate, and the like.

The raw material of the inorganic pigment may have a particle diameter which is too large for printing a thin coating film by using gravure technique. In this case, the diameter of the pigment is required to be decreased by a general grinding method. In examples below, grinding is performed by chromium stainless steel and/or yttrium stabilized zirconia girding beads, YTZ (registered trademark). By decreasing the particle diameter, the pigment packing density can be improved, and a printing defect in the printing method used can be removed. Grinding the pigment influences the amount of total reflection of infrared light of a printed coating film.

Although total reflection light, direct reflection light, and diffuse reflection light can be discriminated, the percent reflectance data reported below shows total reflection light. In reference examples described later, the total reflectance R/[%] is measured by Perkin Elmer LAMBDA 900 UV/VIS/NIR spectrometer provided with a 150-mm integrating sphere. A measured value is measured within a wavelength range of 800 to 900 nm, and a value at a wavelength of 850 nm is reported.

The viscosity of an ink is measured by a Brookfield DV2T viscometer using a SC4-18 spindle in a cup. The ink discussed in the present disclosure has 50 (±20) centipoise (CPS) at 20 RPM (shear rate of 26.4/s). The viscosity of the ink can be changed so as to satisfy printing requirements. In the case of the flexographic printing method, the viscosity is preferably as low as 1 cps, while in the case of screen printing application, the viscosity is preferably as high as 200,000 cps.

Geiger Gravure Printing Press—Proofing and Production unit is used for printing an ink on a transparent polyethylene terephthalate (PET) film. A cylinder of 1.5" in diameter and 4.5" in length is engraved with 150 lines per inch (that is, 150 LPI) aligned at 450 and having cells which have a 135-μm square pyramid shape and a depth of 38 μm. The printing speed is about 90 feet/min. Unless otherwise described, the results are those obtained by twice passage through a printing unit.

In the reference examples described later, with respect to the CIE color values (L*, a*, b*), a D50 spectrum is measured at 2° by using a X-Rite Spectro Eye spectrophotometer according to the measurement standard of JIS Z 8722. The glossiness is measured by using BYK 4563 micro-TRI-gloss meter at a set angle of 60° according to the measurement standard of JIS Z 8741. A sectional image of a coating film printed on PET is photographed by a Topcon scanning electron microscope.

(Ink Containing Organic Black Pigment)

An ink containing an organic black pigment can be used for the infrared reflecting layer formed as a black coating film which reflects infrared light.

Examples of an infrared non-absorbing pigment, that is, a near-infrared reflecting pigment, include azo-based, anthraquinone-based, phthalocyanine-based, perinone-perylene-based, indigo-thioindigo-based, dioxazine-based, quinacridone-based, isoindolinone-based, isoindoline-based, diketopyrrolopyrrole-based, azomethine-based, and azomethineazo-based organic pigments, and preferred examples of the organic black pigment include azo-based, azomethineazo-based, and perylene-based organic black pigments.

The ink containing the organic black pigment is preferably an ink containing an azo organic black pigment. A black pigment which reflects near-infrared light without absorbing near-infrared light is known as the azo organic black pigment. Examples thereof include azo organic black pigments such as (2-hydroxy-N-(2'-methyl-4'-methoxyphenyl)-1-([4-[(4,5,6,7-tetrachloro-1-oxo-2,3-dihydro-1H-isoindol-3-ylidene)amino]phenyl]azo)-11H-benzo[a]-carbazole-3-carboxyamide), 1-{4-[(4,5,6,7-tetrachloro-3-oxoisoindolin-1-ylidene)amino]phenylazo}-2-hydroxy-N-(4'-methoxy-2'-methylphenyl)-11H-benzo[a]carbazole-3-carboxamide (CAS No.: 103621-96-1), 2-hydroxy-N-phenyl-1-{[(4-(4,5,6,7-tetrachloro-1-oxo-2,3-dihydro-1H-isoindol-3-ylidene)amino]phenyl]azo}-11H-benzo[a]-carbozole-3-carboxamide, 2-hydroxy-N-(2'-methyl-4'-methoxyphenyl)-1-{[4-[(4,5,6,7-terrachloro-1-oxo-2,3-dihydro-1H-isoindol-3-ylidene)amino]phenyl]azo}-11H-benzo[a]-carbazole-3-carboxamide, and the like. The azo-based organic black pigment is used as an ink and coated on the base sheet according to a usual method, thereby forming a coating film having infrared reflection property.

Examples of a coating method include anastatic printing, flexographic printing, dry offset printing, gravure printing, gravure offset printing, offset printing, screen printing, and the like. The gravure printing method is most preferred for coating a thin film.

As shown in FIG. 13, the black sheet 1 according to the first embodiment includes a laminate of the base sheet 11 and the infrared reflecting layer 12.

For example, an adhesive layer 16 is attached to at least one of the sides of the black sheet 1, thereby enabling the use as a black adhesive tape 2 described below.

The black adhesive tape 2 can be preferably used for adjusting the infrared reflectance of a black adhesive tape attached to a functional sheet for an electronic component, such as a heat dissipation sheet, a magnetic sheet, an insulation sheet, ore the like.

Figure 14:
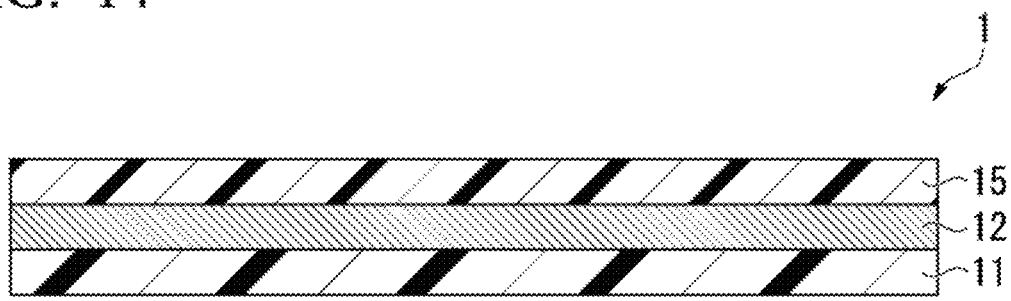
FIG. 14 is a schematic sectional view showing a modified example of the black sheet 1 according to the first embodiment.

As shown in FIG. 14, the black sheet 1 may include a matte layer 15. FIG. 14 is a schematic sectional view showing a modified example of the black sheet 1 according to the first embodiment. The black sheet 1 shown in FIG. 14 includes the base sheet 11, the infrared reflecting layer 12, and the matte layer 15, which are laminated in this order.

The black sheet 1 shown in FIG. 14 has the CIE color values (L*, a*, b*) and infrared reflectance R/[%] at a wavelength of 850 nm within the respective ranges described above, which are measured from the matte layer 15 side.

Also, the black sheet 1 shown in FIG. 14 has the matte layer 15, and thus the glossiness Gu measured from the matte layer 15 side at a set angle of 60° according to JIS Z 8741 is easily adjusted within the following range.

$$0 \leq Gu \leq 10$$

The glossiness Gu of the black sheet is preferably 0≤Gu≤10, more preferably 0 S Gu S 6, and most preferably 0≤Gu≤4.

(Matte Layer)

The matte layer used for the black sheet and the black adhesive tape of the present invention is a layer which adjusts the glossiness Gu of the black sheet and the black adhesive tape.

The thickness of the matte layer is preferably 0.50 to 4.0 µm, more preferably 0.75 to 3.0 µm, and most preferably 1.0 to 2.0 µm. Within the range, in the case of use for protection of a functional sheet for an electronic component, both preferred glossiness and thinness can be easily satisfied.

The matte layer car be formed by coating a known surface treatment agent, which contains a matte agent (that is, a matte agent) containing fine particles of silica, calcium carbonate, barium carbonate, or the like dispersed in a resin binder, on the outermost surface of the black sheet or the black adhesive tape. Examples of the coating method include anastatic printing, flexographic printing, dry offset printing, gravure printing, gravure offset printing, offset printing, screen printing, and the like. The gravure printing method is most preferred for coating a thin film.

Second Embodiment

The black adhesive tape according to this embodiment of the present invention includes a laminate of the black sheet according to the first embodiment and an adhesive layer.

In the measurement of the CIE color values (L*, a*, b*), infrared reflectance R at a wavelength of 850 nm, and glossiness Gu from the side opposite to the side having the adhesive layer, the black adhesive tape has the same values as the CIE color values (L*, a*, b*), infrared reflectance R at a wavelength of 850 nm, and glossiness Gu measured from the same side of the black sheet according to the first embodiment.

Figure 15:
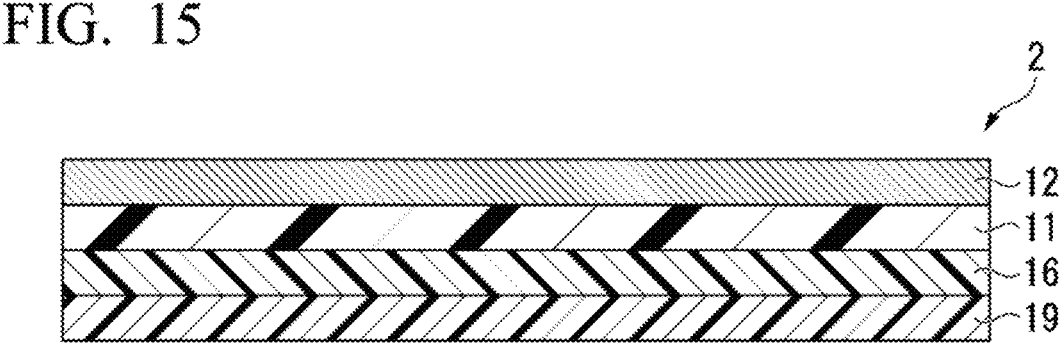
FIG. 15 is a schematic sectional view showing an example of a black adhesive tape 2 according to a second embodiment.

FIG. 15 is a schematic sectional view showing an example of a black adhesive tape 2 according to a second embodiment, which includes a release liner 19, an adhesive layer 16, a base sheet 11, and an infrared reflecting layer 12, which are laminated in this order.

When the black adhesive tape 2 according to the second embodiment is used, the release liner 19 is removed before use.

For example, the release liner 19 of the black adhesive tape 2 is removed, and the surface on the adhesive layer 16 side is attached to a graphite sheet serving as a heat dissipation sheet, thereby enabling the use as a cooling method for an electronic component in a small electronic terminal. In this case, the black adhesive tape 2 has excellent designability because it has the same color as a black adhesive tape used for protecting another graphite sheet and colored with carbon black. Also, a graphite sheet protected by the black adhesive tape colored with carbon black absorbs near-infrared light, but the black adhesive tape 2 has the property of reflecting near-infrared light, and thus both can be discriminated by using an infrared camera.

In addition, a usual magnetic sheet or insulation sheet is protected by a black adhesive tape colored with carbon black.

The adhesive layer 16-side surface of the black adhesive tape 2 is attached to a magnetic sheet, and the magnetic sheet protected by the black adhesive tape 2 can be used as a noise preventing method for an electronic component in a small electronic terminal. Thus, electronic components are allowed to have the same black color and excellent designability, and the electronic components have different near-infrared reflection properties and thus can be discriminated from an electronic component protected by another tape by using an infrared camera.

The adhesive layer 16-side surface of the black adhesive tape 2 is attached to an insulation sheet, and the insulation sheet protected by the black adhesive tape 2 can be used as an electric insulating method for an electronic component in a small electronic terminal. The adhesive tape can be discriminated from another tape by using an infrared camera.

The total thickness of the black adhesive tape is preferably 2.5 to 100 μm, more preferably 3.0 to 40 μm, and particularly preferably 3.5 to 12.5 μm. Within the range, in the case of use for protection of a functional sheet for an electronic component, mechanical strength, thinness, and adhesive strength are easily simultaneously satisfied. The total thickness of the black adhesive tape is the total thickness of the black adhesive tape excluding the release liner.

(Adhesive Layer)

The thickness of the adhesive layer of the black adhesive tape of the present invention is preferably 1 to 50 μm, more preferably 1.5 to 20 μm, and most preferably 2 to 5 μm. Within this range, in the use for protection of a functional sheet for an electronic component, both adhesive strength and thinness can be easily satisfied.

The adhesive layer can be formed by coating an adhesive on the release liner. Examples of the coating method include gravure coating, comma coating, bar coating, die coating, lip coating, screen coating, and the like. The gravure coating is most preferred for coating a thin film.

The adhesive used for forming the adhesive layer of the black adhesive tape of the present invention is not particularly limited and can be properly selected from known adhesives, for example, an acrylic adhesive, a rubber-based adhesive, a silicone-based adhesive, a urethane-based adhesive, a polyester-based adhesive, a styrene-diene block copolymer-based adhesive, a vinyl alkyl ether-based adhesive, a polyamide-based adhesive, a fluorine-based adhesive, a creep characteristic improvement-type adhesive, a radiation-curable adhesive, and the like. These adhesives can be used alone or in combination of two or more.

The acrylic adhesive can be particularly preferably used as the adhesive because of its high adhesive reliability. The acrylic adhesive contains an acrylic polymer as an adhesive component or main agent and, if required, proper additives such as a crosslinking agent, a tackifier, a softener, a plasticizer, a filler, an anti-aging agent, a coloring agent, etc. The acrylic polymer is a polymer containing a (meth)acrylic acid alkyl ester as a monomer main component, and is prepared by using, if required, a monomer (copolymerizable monomer) which can be copolymerized with the (meth)alkyl ester.

The mass-average molecular weight (Mw) of the acrylic polymer is preferably 500,000 to 1,200,000 and more preferably 500,000 to 1,000,000. Within the range described above, satisfactory adhesion and heat resistance can be easily exhibited even by a thin film. The molecular weight is measured by GPC in terms of styrene.

In the present invention, a tackifying resin is preferably added for improving the adhesive force of the adhesive layer. Also, tensile strength and tensile strength at break can be enhanced by adding the tackifying resin, and thus tensile strength and tensile strength at break can be adjusted by properly adding the tackifying resin according to the acrylic copolymer used. Examples of the tackifying resin added to the adhesive layer of the black adhesive tape of the present invention include rosin-based resins such as rosin, rosin ester compounds, and the like; terpene-based resins such as diterpene polymer, α-pinene-phenol copolymer, and the like; aliphatic (C5) and aromatic (C9) petroleum resins and the like; and other resins such as a styrene resin, a phenol resin, a xylene resin, and the like. Among these, in an adhesive composition using an acrylic copolymer containing n-butyl (meth)acrylate as a main monomer component, a mixture of a rosin-based resin and a xylene-based resin is preferably used for satisfying both the adhesive force and heat resistance by a thin form.

Also, a tackifying resin which is liquid at room temperature is preferably mixed and used for increasing initial adhesive force. Examples of the tackifying resin which is liquid at room temperature include liquid resins of the tackifying resins described above, which are solid at room temperature, process oil, a polyester-based plasticizer, and low-molecular-weight liquid rubber such as polybutene and the like. The terpene-phenol resin is particularly preferred. Examples of commercial products include YP-90L manufactured by Yasuhara Chemical Co., Ltd., and the like. The amount of the tackifying resin added is preferably 1 to 20 parts by mass relative to 100 parts by mas the acrylic copolymer.

The amount of the tackifying resin added is preferably 10 to 70 parts by mass and more preferably 20 to 60 parts by mass relative to 100 parts by mas the acrylic copolymer. The adhesive force can be improved by adding the tackifying resin.

The gel fraction of the adhesive layer is not particularly limited, but is preferably 5 to 50%, more preferably 10 to 40%, and still more preferably 13 to 35% because satisfactory adhesion and heat resistance (holding force at high temperature) can be easily exhibited even by a thin film. The gel fraction is determined by measuring, after drying, the mass of the insoluble content remaining after the adhesive layer after curing is immersed in toluene and allowed to stand for 24 hours, and is shown by percentage to the original mass.

Gel fraction=[(mass after toluene immersion of adhesive layer)/(mass before toluene immersion of adhesive layer)]×100

The storage elastic modulus of the adhesive layer is preferably $10^4$ to $4 \times 10^5$ Pa and more preferably $5 \times 10^4$ to $2 \times 10^5$ Pa at a frequency of 1 Hz and 25° C. Within the range described above, high degrees of both wettability (initial tack) and adhesive force can be easily satisfied even by a thin adhesive layer.

The acrylic polymer can be prepared by a commonly used polymerization method such as a solution polymerization method, an emulsion polymerization method, an ultraviolet irradiation polymerization method, or the like.

(Release Liner)

The black adhesive tape of the present invention may have the release liner provided on the surface of the adhesive layer in order to protect the adhesive layer. A known release liner may be properly selected and used as the release liner. A mold-release-treated resin film is preferred because of excellent smoothness. Particularly preferred is a polyester film having excellent heat resistance, which is subjected mold release treatment.

The surface of the release liner is preferably provided with a release treatment layer for imparting easy releasability. The release treatment layer can be formed by any one of various release treatment agents used for the release liner of the adhesive tape, and preferred usable examples of the release treatment agent include silicone-, fluorine-, and long-chain alkyl-based release treatment agents and the like. Also, the release treatment layer may be formed by lamination or coating on the resin film.

The release force of the release liner may be properly adjusted according to the use mode, but the release force for the adhesive layer is 0.01 to 2 N/20 mm and preferably 0.05 to 0.15 N/20 mm because deformation of the black adhesive tape can be easily suppressed when the release liner is released. The release force can be measured by releasing the release liner or the PET-lined adhesive layer having a thickness of 50 μm at a speed of 0.3 to 10 m/min in the 180° direction.

Figure 16:
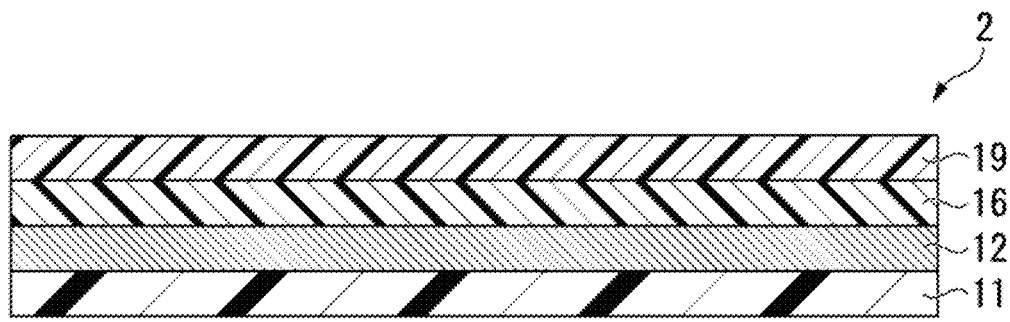
FIG. 16 is a schematic sectional view showing a modified example of the black adhesive tape 2 according to the second embodiment.

As shown in FIG. 16, the black adhesive tape 2 of the second embodiment may have the adhesive layer 16 on the infrared reflecting layer 12 side. FIG. 16 is a schematic sectional view showing a modified example of the black adhesive tape 2 of the second embodiment. The black adhesive tape 2 shown in FIG. 16 includes the base sheet 11, the infrared reflecting layer 12, the adhesive layer 16, and the release liner 19, which are laminated in this order.

Figure 17:
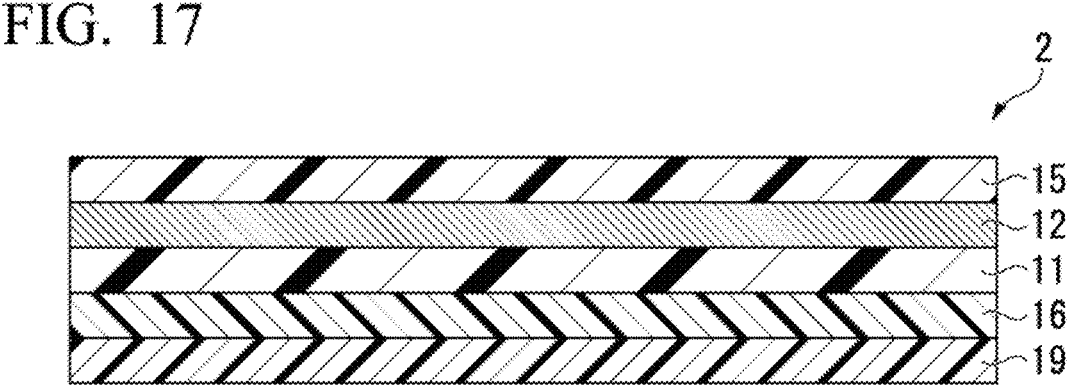
FIG. 17 is a schematic sectional view showing a modified example of the black adhesive tape 2 according to the second embodiment.

As shown in FIG. 17, the black adhesive tape 2 according to the second embodiment may have the matte layer 15. FIG. 17 is a schematic sectional view showing a modified example of the black adhesive tape 2 of the second embodiment. The black adhesive tape 2 shown in FIG. 17 includes the release liner 19, the adhesive layer 16, the base sheet 11, the infrared reflecting layer 12, and the matte layer 15, which are laminated in this order.

Third Embodiment

A black sheet according to this embodiment includes a black infrared reflecting layer 13 and a white infrared reflecting layer 14 which are laminated in the infrared reflecting layer 12 of the black sheet according to the first embodiment.

In the measurement of the CIE color values (L*, a*, b*) and infrared reflectance R at a wavelength of 850 nm from the black infrared reflecting layer 13 side of the black infrared reflecting layer 13 and the white infrared reflecting layer 14, the black sheet according to this embodiment has values within the respective ranges described above. When the black sheet of the embodiment is used as a black adhesive tape, the adhesive layer can be laminated and used on the side opposite to the black infrared reflecting layer 13 of the black infrared reflecting layer 13 and the white infrared reflecting layer 14.

Figure 18:
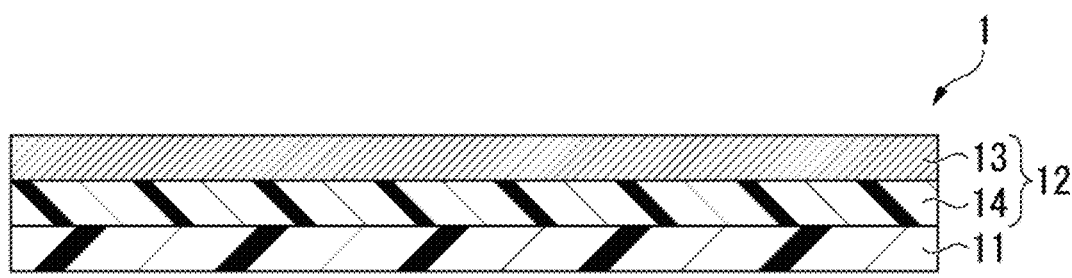
FIG. 18 is a schematic sectional view showing an example of a black sheet 1 according to a third embodiment.

FIG. 18 is a schematic sectional view showing an example of the black sheet 1 of the third embodiment, which includes the base sheet 11, the white infrared reflecting layer 14, and the white infrared reflecting layer 13, which are laminated in this order.

The black infrared reflecting layer 13 and the white infrared reflecting layer 14 are laminated, and thus the infrared reflectance R measured from the black infrared reflecting layer 13 side can be preferably increased.

(Black Infrared Reflecting Layer)

The black infrared reflecting layer corresponds to only the black layer among the infrared reflecting layers described above.

The thickness of the black infrared reflecting layer is preferably 0.50 to 10 μm, more preferably 0.75 to 8.0 μm, and most preferably 1.0 to 5.0 μm. Within the range described above, in the use for protection of a functional sheet for an electronic component, both preferred glossiness and thinness can be easily satisfied. Within the range described above, in the use for protection of a functional sheet for an electronic component, preferred CIE color values, infrared reflectance, and thinness can be easily simultaneously satisfied.

(White Infrared Reflecting Layer)

The white infrared reflecting layer is a layer having the effect of more increasing the infrared reflectance R by being provided on the back side of the black infrared reflecting layer.

The thickness of the white infrared reflecting layer is preferably 0.50 to 10 μm, more preferably 0.75 to 8.0 μm, and most preferably 1.0 to 5.0 μm. Within the range described above, in the use for protection of a functional sheet for an electronic component, both preferred infrared reflectance R and thinness can be easily satisfied.

The white infrared reflecting layer can be formed by coating, on the back side of the black infrared reflecting layer, a known white ink containing a dispersed white pigment, such as titanium oxide, calcium carbonate, barium sulfate, or the like. Examples of a coating method include anastatic printing, flexographic printing, dry offset printing, gravure printing, gravure offset printing, offset printing, screen printing, and the like. The gravure printing method is most preferred for coating a thin film.

Figure 19:
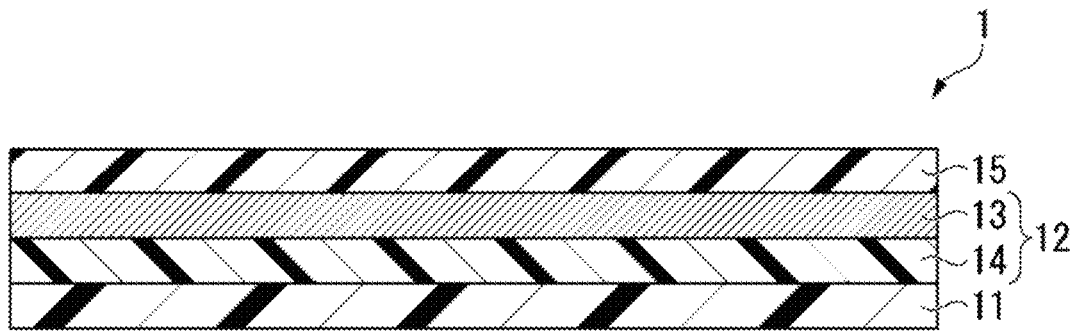
FIG. 19 is a schematic sectional view showing a modified example of the black sheet 1 according to the third embodiment.

As shown in FIG. 19, the black sheet 1 of the third embodiment may include the matte layer 15. FIG. 19 is a schematic sectional view showing a modified example of the black sheet 1 of the third embodiment. The black sheet 1 shown in FIG. 19 includes the base sheet 11, the white infrared reflecting layer 14, the black infrared reflecting layer 13, and the matte layer 15, which are laminated in this order.

The black sheet 1 shown in FIG. 19 includes the matte layer 15, and thus glossiness Gu can be increased. In addition, the black infrared reflecting layer 13 and the white infrared reflecting layer 14 are laminated, and thus the infrared reflectance R measured from the black infrared reflecting layer 13 side can be preferably increased.

Fourth Embodiment

A black adhesive tape of this embodiment includes a laminate of the black sheet of the third embodiment and an adhesive layer.

In the measurement of the CIE color values (L* a*, b*), infrared reflectance R at a wavelength of 850 nm and glossiness Gu from the side opposite to the side having the adhesive layer, the black adhesive tape of this embodiment has values within the respective ranges described above.

Figure 20:
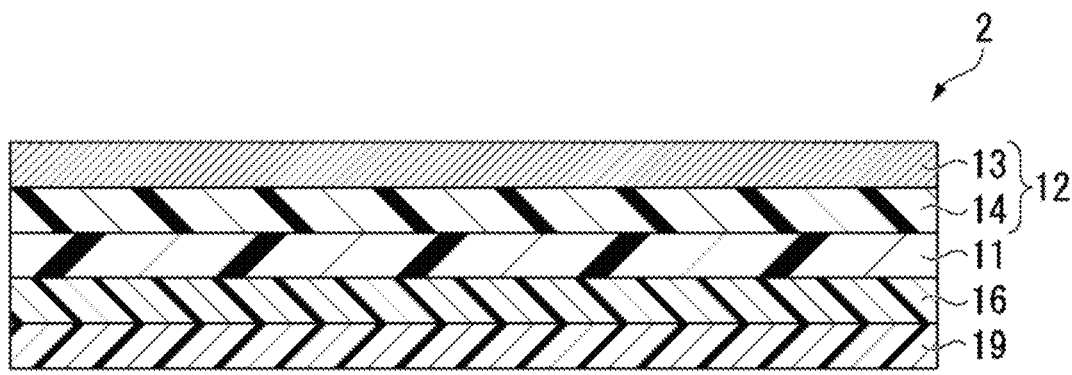
FIG. 20 is a schematic sectional view showing an example of a black adhesive tape 2 according to a fourth embodiment.

FIG. 20 is a schematic sectional view showing an example of the black adhesive tape 2 of the fourth embodiment, which includes the release liner 19, the adhesive layer 16, the base sheet 11, the white infrared reflecting layer 14, and the black infrared reflecting layer 13, which are laminated in this order.

The black infrared reflecting layer 13 and the white infrared reflecting layer 14 are laminated, and thus the infrared reflectance R measured from the black infrared reflecting layer 13 side can be preferably largely increased.

Figure 21:
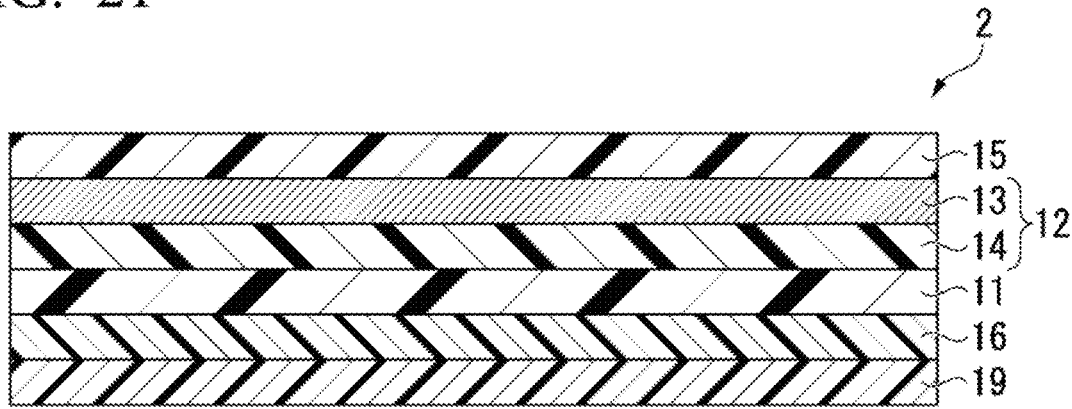
FIG. 21 is a schematic sectional view showing a modified example of the black adhesive tape 2 according to the fourth embodiment.

As shown in FIG. 21, the black adhesive tape 2 of the fourth embodiment may have the matte layer 15. FIG. 21 is a schematic sectional view showing a modified example of the black adhesive tape 2 of the fourth embodiment. The black adhesive tape 2 shown in FIG. 21 includes the release liner 19, the adhesive layer 16, the base sheet 11, the white infrared reflecting layer 14, the black infrared reflecting layer 13, and the matte layer 15, which are laminated in this order.

The black adhesive tape 2 shown in FIG. 21 includes the matte layer 15, and thus glossiness Gu can be increased. In addition, the black infrared reflecting layer 13 and the white infrared reflecting layer 14 are laminated, and thus the infrared reflectance R measured from the black infrared reflecting layer 13 side can be preferably largely increased.

<Infrared Reflecting Ink, Printed Matter, and Adhesive Tape>

The present application provides an infrared reflecting ink for gravure printing or flexographic printing on PET, a printed matter containing the ink, and a method for forming an adhesive tape.

An adhesive tape according to an embodiment includes an (a) an infrared reflecting black coating film (upper) of 2 μm; (b) a transparent PET (middle) of 2 μm; and (c) a transparent adhesive layer (lower) of 1 to 2 μm. A black coating film layer is preferably formed by gravure printing or flexographic printing of an infrared reflecting ink of the present invention on a transparent polyethylene (PET), but another printing method (for example, lithography, screen, or digital printing, or the like) can also be used. In examples described later, an infrared reflecting black coating film layer is formed on a substrate by using gravure printing.

In an embodiment, a dry ink coating film has a thickness of 0.1 to 5 μm and is provided on a PET film of 1 to 200 μm. The total infrared reflectance at a wavelength of 850 nm of the dry ink coating film is preferably larger than 5%, more preferably larger than 10%, still more preferably larger than 20%, and most preferably larger than 25%.

In another embodiment, the dry ink coating film has the following color tone: $L^*=22.5$ (±5 and more preferably ±2.5), $a^*=0$ (±2 and more preferably ±1), and $b^*=-1$ (±2 and more preferably ±1).

In still another embodiment, the dry ink coating film preferably has a glossiness of 10 or less, more preferably 5 or less, and most preferably 2±2, measured at a set angle of 60°.

In a further embodiment, the color of an infrared reflecting coating film can contain a low hue color other than black. The color may be brown, green, or the like. The color can contain any $a^*$ value and $b^*$ value and an $L^*$ value of less than 45 following the CIE color value ($L^*$, $a^*$, $b^*$) color space.

A usual infrared reflecting coating film is colored with an inorganic black pigment, but a three-color pigment-based or azo-based organic black pigment may be used. In this case, there is no need for a triblock dispersant for stabilizing the ink.

An infrared reflecting ink is required to have physical properties suitable for gravure or flexographic printing or another printing method. The printed coating film enables the boundaries of components to be discriminated when exposed to infrared light and observed (detected) at an infrared light wavelength. The dried coating film preferably has a thickness of 1 to 10 μm and can be printed on paper, a polymer film, a metal foil, glass, or another substrate. The substrate printed with the coating film preferably has a total reflectance (hemispherical reflectance at a wavelength of 850 nm) of 15% larger than that of an infrared absorbing color portion. The infrared reflecting coating film functions to provide discrimination of the boundaries between a plurality of substrates colored in the same manner.

For example, the coating film can be used for an adhesive tape. In assembling electronic components in a small electronic terminal, a machine is required to properly position and arrange the electronic components in a two-axis or three-axis coordinate system by properly discriminating the edges of the components. The boundaries between the components are required to be clearly discriminated in an automatic assembly system. Two visually similar components cannot be discriminated by using a visible spectrum, and thus an edge discriminating method other than a visual spectrum is required. Specifically, a problem occurs when an electronic component protected by a black adhesive tape is placed on an electronic component with a portion protected by another black adhesive tape. A solution provided in the specification of the present invention makes it possible to specify the edge of the infrared reflecting black adhesive tape by using an infrared light source and sensor (camera) and to arrange related components at correct positions.

The present invention relates to a composition and process for forming a black or dark-color coating film reflecting near-infrared light (NIR). There has not been a method for achieving a visually dark color in spite of having high reflectance in the near-infrared region by applying a coating film. A high reflectance in the near-infrared region is preferably achieved by using a black inorganic oxide pigment composed of chromium iron oxide. A coating film having a dry thickness of 2 μm and preferably having a CIE color $L^*$ value of 36 or less can reflect 12% or more of light at a wavelength of 850 nm. In the specification of the present invention, such a coating film is produced by a "pigment-containing liquid" referred to as an "ink". The ink is in a liquid state and, when dried, it functions as an infrared reflecting coating film.

The present invention is particularly advantageous for application in which a black electronic component is required to be arranged to overlap another black component in a small electronic terminal. In an automatic assembly system, it is necessary to discriminate the edges between two components. In an automatic assembly system, the infrared reflecting coating film of the present invention makes it possible to discriminate an infrared reflecting black component and another black component, which does not reflect (but absorbs) infrared reflection light, by using an infrared light source and an infrared camera. The amount of light reaching a sensor of the camera decreases according to the inverse-square law of the distance, and thus a high infrared reflectance exceeding 25% at a wavelength of 850 nm is preferred.

The ink can be mainly selected from combinations of an infrared reflecting inorganic pigment, an organic resin, and a solvent, and can be adapted to various printing methods such as gravure and flexographic printing and the like. The ink can contain as, additional components, an organic pigment of dye, a dispersant, a defoaming agent, a matte agent, wax, and other materials, and these can be used for adjusting printing parameters and/or performance specifications (color, friction coefficient, gloss, abrasion resistance, adhesion, etc.) and ink characteristics. Similarly, in order to improve the final performance such as color, friction coefficient, glossiness, abrasion resistance, adhesion, etc., another coating film not containing the infrared reflecting pigment can be applied on the infrared reflecting coating film.

The present invention including the preferred embodiments is described in detail above. However, in consideration of the present disclosure, it is desired for a person skilled in the art to understand that the present invention can be modified and/or improved within the scope and gist of the present invention.

EXAMPLES

Next, the present invention is described in further detail by giving examples, but the present invention is not limited to these examples below.

Reference Example 1

<<Preparation of Ink>>

First, varnish was produced and used for preparing an ink. The varnish was preparing by adding 25 parts of polyvinyl butyral resin Mowital B16 to 75 parts of a mixed solvent prepared by mixing ethanol, and n-propyl acetate at a ratio of 40:60. The varnish was mixed with iron chromium oxide and a black pigment and dispersed at 2000 rpm for 10 minutes by using Cowles blade on Dispermat mixer. In the specification of the present invention, the resultant mixture is referred to as the "base". When the iron chromium oxide and black pigment are not ground, it is necessary to further add the mixed solvent (referred to as the "(40%/60%) solvent system"). In order to enhance printability, the varnish or solvent is added until the viscosity finally reaches 50 cp (±20). In order to rapidly decrease the viscosity, it is preferred to add the solvent rather than the varnish. By adding a proper amount, a proper pigment filling amount and viscosity can be obtained.

For a ground ink, the base was ground in two stages. First, the base was ground with 1.5-mm chromium stainless steel grinding media on a paint shaker. Then, the base was evacuated from the grinding media. Next, the (40%/60%) solvent system at a weight ratio of 30% was added, and the ink was again ground by using 0.8-mm YTZ (registered trademark) grinding media on a pain shaker. Then, the ink was again evacuated. In order to determine the amount of the pigment, the solid content was measured and calculated by using a general method. Finally, the solvent system and/or varnish was added to prepare an ink having a target pigment concentration and a viscosity of 50 cp (±20).

The stabilities of pigments of different grades obtained by a plurality of makers were compared by using different dispersants. A preferred grade was BK 10P950 manufactured by The Shepherd Color Company, and this showed high stability without using a dispersant. The other pigments and grades could be used.

Reference Example 2

(Color and Reflectance of Coating Film)

The influences of the pigment concentration on the color and reflectance of a coating film were evaluated. Inks 2A to 2C were prepared according to Reference Example 1, and a base containing varnish and a pigment was prepared. In this example, 25 parts of solvent was added to 75 parts of the base. The inks 2A to 2C were not subjected to a grinding step. Each of the inks was gravure-printed on a PET substrate and dried in each of the steps. The 200 LPI cylinder used for printing had a small transfer amount, and thus three-layer coating was required for obtaining the thickness of a proper infrared reflecting layer. The printing quality of the formed infrared reflecting layer was not satisfactory.

In order to improve the printing quality, the base and ink were ground before printing. Inks 2D to 2F were prepared according to the procedures of grinding and sieving of Reference Example 1. The varnish and pigment were ground for 2 hours by using 1.5-mm chromium stainless steel grinding media. Then, 25 parts of a solvent was added to 70 parts by the resultant base and further ground for 2 hours by using 0.8-mm YTZ (registered trademark) grinding media. The viscosity was confirmed, and then 5 parts of the varnish and the solvent was further added. In this case, the material added was mostly the solvent. These inks were fell within the viscosity range of 50 cp (±20). When the pigment filling amount was 20% or more, the thickness of a proper infrared reflecting layer was obtained by two-layer coating, and thus a different cylinder was used.

With the inks 2A to 2C, different values of the CIE color values (L*, a*, b*) and infrared reflectance R/% at a wavelength of 850 nm were obtained. A lower L* value indicates a darker color with a smaller amount of reflected light, and a higher value indicates a lighter color. A decrease in the pigment level in the mixture decreased the L* value and increased the infrared reflectance R/[%]. When the amount of the pigment in the mixture was less than 20%, in the use of the printing cylinder described above, there was the need to increase the number of times of coating in order to obtain the proper thickness of the infrared reflecting layer.

Figure 1:
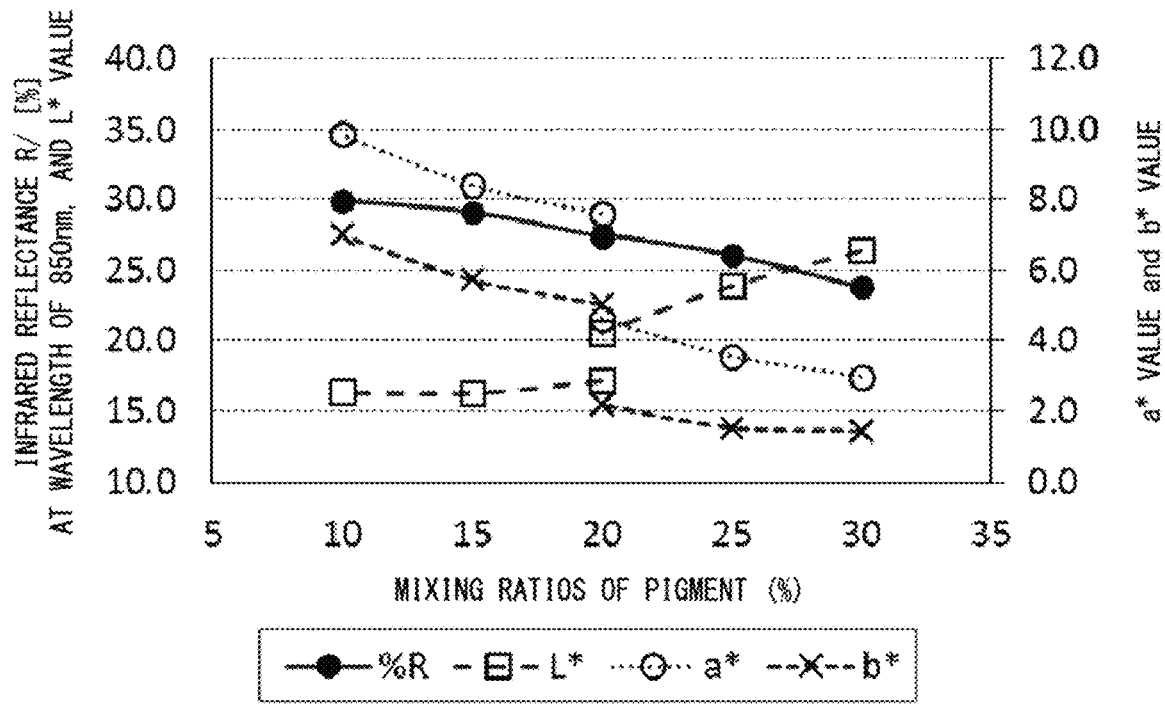
FIG. 1 is a graph showing the relationships of infrared reflectance R/[%] at a wavelength of 850 nm and CIE color values (L*, a*, b*) to mixing ratios of a pigment.

Comparison between the inks 2D and 2F and the inks 2A to 2C indicates that the CIE color values (L*, a*, b*) and the infrared reflectance R/[%] are influenced by both the printing cylinder and the grinding media. In FIG. 1, comparison between the inks 2C and 2D indicates that a change in thickness of the infrared reflecting layer by using the new cylinder or grinding causes differences in the CIE color values (L*, a*, b*) between the inks with the same pigment concentration of 20%. However, the infrared reflectance R/[%] is continuous. This indicates that the infrared reflectance R/[%] is not influenced by the presence of grinding and the thickness.

The thickness of the infrared reflecting layer has another influence. The number of times of coating and the infrared reflectance R/[%] have a trade-off relationship, and FIG. 1 shows an example in which the number of times of coating was increased from 3 to 5 in the three lines of 2F. With the number of times of coating of 4, the infrared reflectance R/[%] is a maximum value. When the printing thickness is made thick by 5 times of coating, the L* value is continuously decreased, and the infrared reflectance R/[%] at a wavelength of 850 nm also starts to be decreased.

Table 1 shows the influences of the pigment concentration on the infrared reflectance R/[%] at a wavelength of 850 nm and CIE color values (L*, a*, b*).

TABLE 1

| Ink | Pigment mixing ratio % | Number of times of coating | Cylinder | Grinding | Infrared reflectance at wavelength of 850 nm R/[%] | L* | a* | b* | Glossiness |
|---|---|---|---|---|---|---|---|---|---|
| 2A | 30 | 3 | 200 | None | 23.8 | 26.4 | 3.0 | 1.4 | 5.0 |
| 2B | 25 | 3 | 200 | None | 26.1 | 23.9 | 3.6 | 1.5 | 8.3 |
| 2C | 20 | 3 | 200 | None | 27.6 | 20.6 | 4.6 | 2.2 | 15.7 |
| 2D | 20 | 3 | 150 | 2 Hr_2 Hr | 27.3 | 17.2 | 7.6 | 5.0 | 68.6 |
| 2E | 15 | 3 | 150 | 2 Hr_2 Hr | 29.1 | 16.3 | 8.4 | 5.7 | 66.0 |
| 2F | 10 | 3 | 150 | 2 Hr_2 Hr | 29.9 | 16.4 | 9.9 | 7.0 | 73.1 |
| 2F | 10 | 4 | 150 | 2 Hr_2 Hr | 30.3 | 15.8 | 9.6 | 7.0 | 63.4 |
| 2F | 10 | 5 | 150 | 2 Hr_2 Hr | 29.3 | 15.5 | 9.3 | 6.9 | 65.3 |
| ABS1 | 25 | 2 | 150 | 10 min | 10.5 | 12.3 | −0.8 | −3.8 | 96 |
| ABS2 | 25 | 2 | 175 |  | 4.2 | 22.5 | 0 | −1 | 2.1 |

Infrared absorbing ink "ABS1" shown in Table 1 is prepared by using a carbon black pigment. The infrared reflectance R/[%] is much lower than that measured with the infrared reflecting layer, but the total reflectance is not near to zero. The total reflectance does not become zero because of a difference in refractive index at the boundary between air and the infrared reflecting layer. Then, a matte agent layer was coated on a different carbon black ink layer to prepare ink ASB2.

Figure 2:
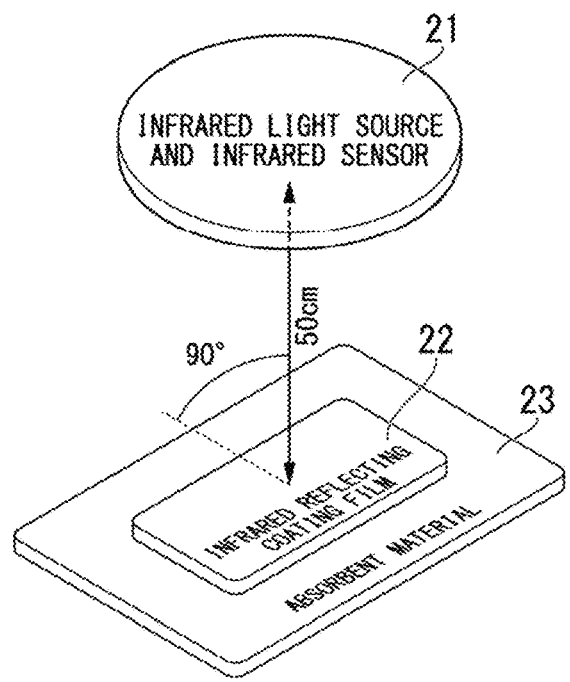
FIG. 2 is an image when an infrared absorbing substrate and an infrared reflecting substrate are discriminated by using an infrared light source and an infrared camera. A difference in infrared reflectance R between both substrates is preferably more than 15%.

The degree of difference in infrared reflectance R/[%] necessary for discriminating boundaries can be estimated by using an infrared light source and an infrared camera. In setup, it is necessary to specify the number of watts of the infrared light source, the known sensor sensitivity (camera sensor), the angle and distance between the light source and a reflection substrate, and the distance to the camera. In general, in the case of Cognex commercial light source and camera, the total reflectance of the infrared reflecting coating film measured by a semispherical reflection system is preferably ≥15% and preferably ≥20%, and the reflectance is higher than the total reflectance of an absorbent material under the following conditions. The light source and the camera are disposed on the same plane, and at a distance of 50 cm from a substrate, both make light incident almost vertically to the substrate. FIG. 2 is an image when an infrared absorbing substrate and an infrared reflecting substrate are discriminated by using an infrared light source and an infrared camera.

A preferred reflectance difference (ΔR) of 15% or more is determined by the quantitative evaluation of evaluating whether or not discrimination can be made by using the infrared light source and infrared camera and the correlation to the total reflectance of each substrate. In order to make discrimination, surface roughness Ra is required to be such a value as not to increase infrared light scattering. The surface roughness Ra is determined by the degree of deviation from a reference line in the vertical direction. All the Ra values of coating films discussed in the specification of the present invention are less than 1.0 μm. A Ra value up to 1.0 μm does not increase the scattering of infrared light at a wavelength of 850 nm.

Reference Example 3

(Coating Film Thickness Per Number of Times of Coating)

The dried coating film for the black infrared reflecting layer preferably has a thickness of 1.0 to 5.0 μm, but with the thickness of 2.0 m or less, a smooth coating film cannot be obtained by inorganic pigment particles with an average diameter of about 1 μm. As the particle diameter nears to the film thickness, the formation of a smooth coating film becomes difficult, and the surface roughness Ra also comes near to 1 μm. With an unground pigment, the desirable dried coating film thickness is 2 μm or more and 5 μm or less. A series of inks was prepared by using a general laboratory grinding method according to Reference Example 1. These inks had a pigment filling concentration of 25% and a resin filling concentration of 12.5%. A ground ink enables the formation of a more uniform coating film. The thickness of the ground ink was measured by using SEM. In addition, the coating film was printed by a pyramid-shaped 150 LPI cylinder. The cylinder was a 45-degree oblique line type having a cell depth of 38 μm, a cell height and width of 135 μm, a cell spacing of 10 μm.

Figure 3:
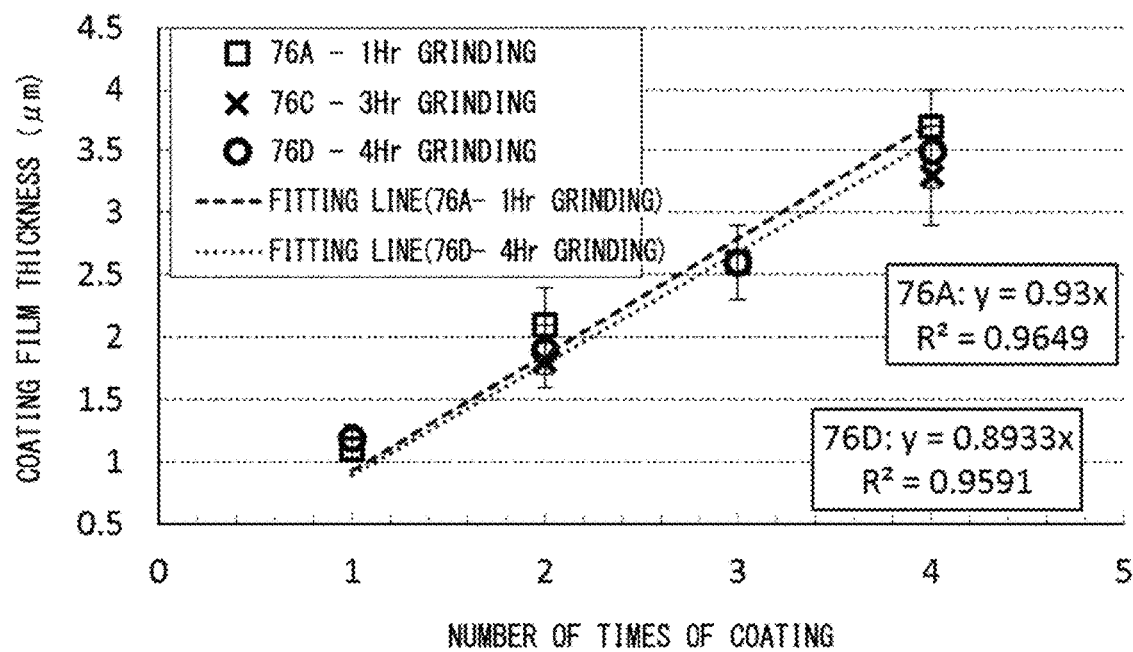
FIG. 3 is a graph showing the relationships of the number of times of coating to the thickness measured by SEM for inks with different grinding times. It shows that the thickness of an ink coating film formed by using a cylinder with 150 lines per inch (referred to as "LPI" hereinafter) is less than 1 m per layer coating.

By using Geiger Gravure Printing Press, printing was performed through a drying stage between the layers including first to fourth layers, and the thicknesses of ink coating films were compared by using SEM. In order to confirm that grinding for 1 hour or more has no influence on a decrease in the thickness of the ink coating film, the thickness of each of a plurality of coating films after grinding for 1 hour, 3 hours, and 4 hours was measured. Grinding was performed for a specified time by using both 1.5-mm chromium stainless steel and subsequent 0.8-mm YTZ (registered trademark) ceramic grinding media. As a result, it was found that with a grinding time of 1 hour or more, the coating film thickness per layer coating is less than 1 μm regardless of the time. These results are shown in FIG. 3. With respect to coating with coating times of 1 hour and 4 hours, linear approximation is shown, and the y-intercept is set to zero. $R^2$ represents the square of correlation (coefficient of determination). The gradient of linear approximation suggests that the dried coating film thickness continuously decreases with increases in the grinding time, but statistical significance is not recognized.

Reference Example 4

(Influence of Grinding on Total Reflectance and Color)

The influences of the grinding time and the number of times of coating on the infrared reflectance and CIE color values (L*, a*, b*) were investigated by using the inks of Reference Example 3. An increase in the number of times of coating represents an increase in thickness of a dried coating film and ink. First, an ink ground for 6 hours by 1.5-mm chromium stainless steel were formed using the unground ink. Then, each of the inks was ground for the same time by using 0.8-mm YTZ (registered trademark) ceramic grinding media. The grinding times of the inks by using the grinding media was the same, and the total grinding time was 0, 2, 4, 8, and 12 hours. In addition, coating was performed on the substrate 1 to 4 times by using the same cylinder as in Reference Example 3 while drying at each time of coating, and infrared reflectance and CIE color values (L*, a*, b*) were evaluated.

Figure 4:
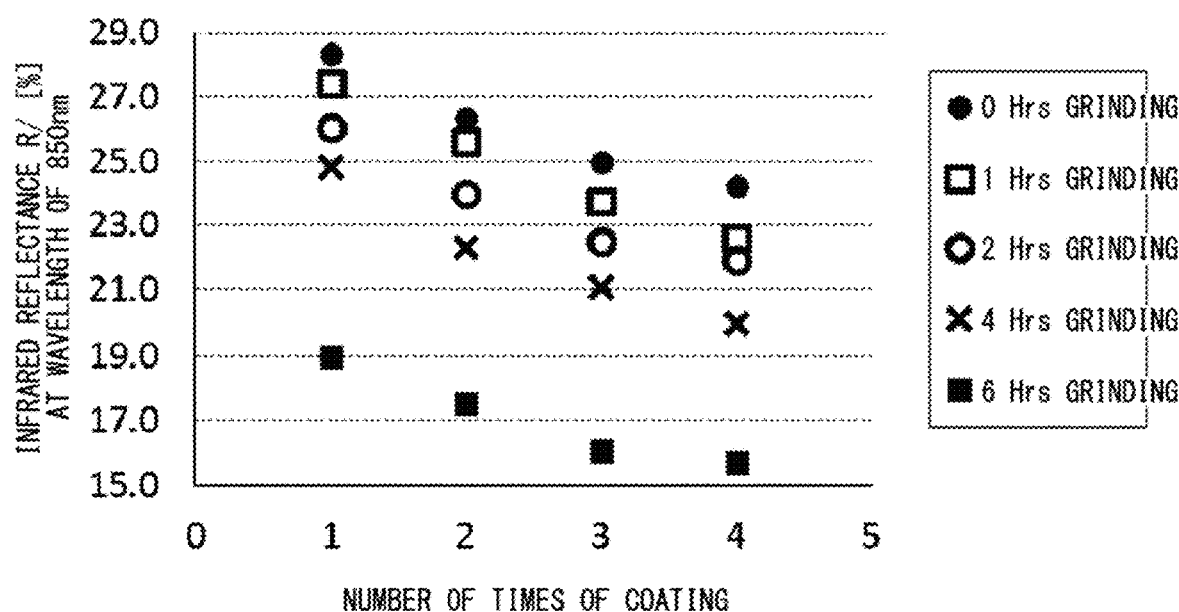
FIG. 4 is a graph showing the relationships of infrared reflectance R/[%] at a wavelength of 850 nm to the number of times of coating. It shows that the infrared reflectance R at a wavelength of 850 nm decreases with increases in grinding time, and a thinner coating film has higher reflectance.
Figure 5:
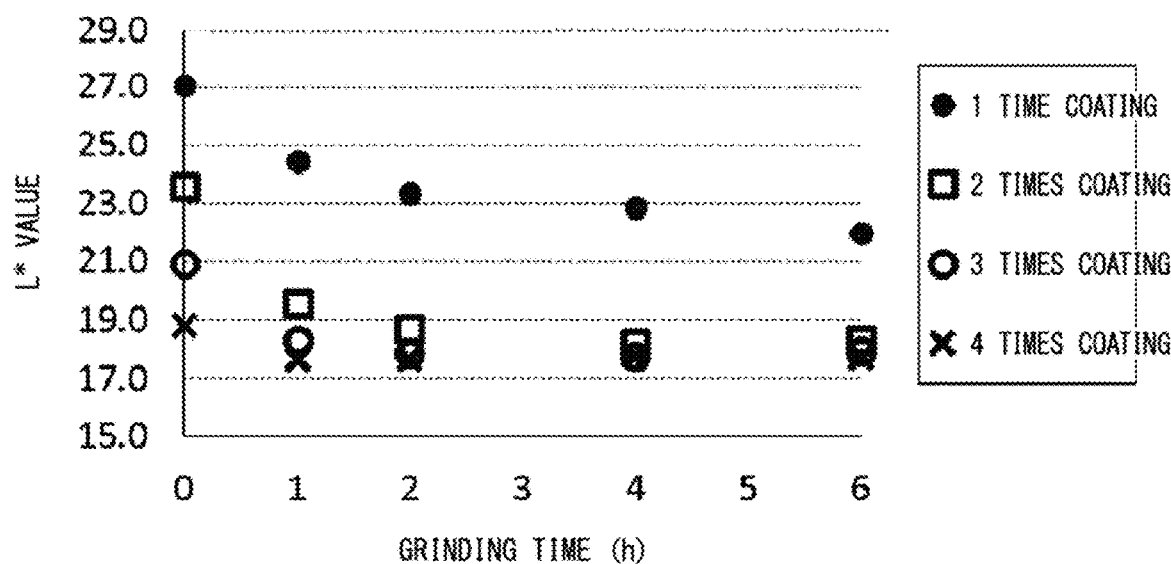
FIG. 5 is a graph showing the relationships of CIE color value (L*) to grinding times. It shows that without grinding, the L* value greatly varies with changes in the ink thickness, while with grinding, the L* value converges regardless of the ink thickness.
Figure 6:
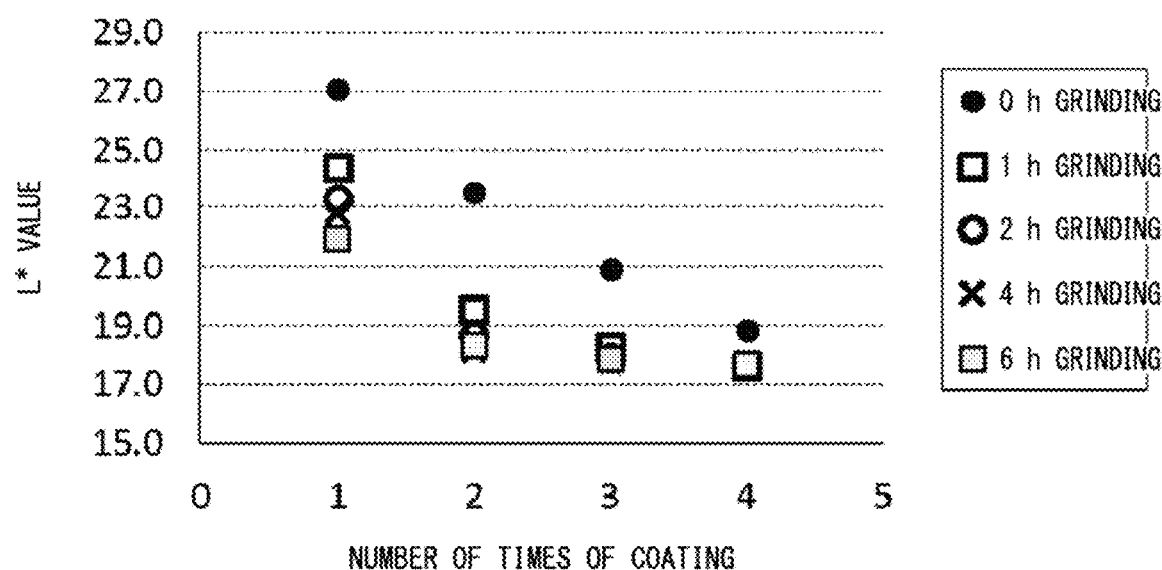
FIG. 6 is a graph showing the relationships of CIE color value (L*) to the number of times of coating when the grinding time is changed. It shows that when the ink is ground, the L* value converges with increases in ink thickness.

Table 2 shows all related data, and FIG. 4 FIG. 5, and FIG. 6 emphatically show important results. First, FIG. 4 shows that grinding of an ink decreases the infrared reflectance of a coating film. Second, FIG. 4 shows that coating of a thick film also decreases the infrared reflectance. The CIE color values (L*, a*, b*) are preferably evaluated by the coating film thickness rather than the number of times of coating. When the 150-LPI cylinder described above is used, the coating film thickness at each time of coating was assumed to be 1 μm with reference to the data shown in FIG. 3. FIG. 5 shows that without grinding, the L* value is largely diverged with changes in the coating film thickness. In addition, FIG. 5 shows that the L* value is sufficiently converged by two or more times of coating of the ink ground for 1 hour or more. Similarly, the same divergence and convergence are shown for the a* value and b* value shown in Table 2. FIG. 6 shows how important 2 μm (two-layer coating) is for controlling the CIE color values (L*, a*, b*). With a coating film of 1 μm (one-layer coating) shown in FIG. 5, a difference in L* (L*$_{MAX}$−L*$_{MIN}$) between different grinding times is 4.7, while with a coating film of 2 μm (2-layer coating), this difference is decreased to about 60%.

The treatment and thickness of an ink greatly influence the performance of infrared reflectance R of a coating film. An unground ink shows higher infrared reflectance R, and thus grinding is not desired, but a thin coating film printed by a gravure or similar printing technique exhibits unacceptable printing quality. In order to adjust a good color by the recipe (mixing and production process) described above, a coating film thickness of 1 μm or more is required. Therefore, although the infrared reflectance R is decreased, two-layer coating is required. In order to achieve a reflectance difference (ΔR) of 15% necessary for discriminating a boundary with an infrared non-reflecting black layer having an infrared reflectance R of 10%, a coating film with an infrared reflectance R of 25% is required. With a series of the inks, if the pigment filling ratio is 25%, an infrared reflectance R of 25% is achieved by two-layer coating of only the ink ground for 1 hour.

Table 2 shows comparison between the influences of the coating time and the number of times of coating on the infrared reflectance R/[%] at a wavelength of 850 nm and CIE color values (L*, a*, b*).

TABLE 2

| Grinding (h) | 0 | 0 | 0 | 0 |
|---|---|---|---|---|
| Number of times of coating | 1 | 2 | 3 | 4 |
| Infrared reflectance at wavelength of 850 nm R/[%] | 28.3 | 26.4 | 25.0 | 24.2 |
| L* | 27.1 | 23.6 | 20.9 | 18.8 |
| a* | 4.2 | 3.3 | 3.8 | 4.4 |
| b* | 2.2 | 1.1 | 1.4 | 1.8 |
| Grinding (h) | | | | |
| Number of times of coating | 1 | 2 | 3 | 4 |
| Infrared reflectance at wavelength of 850 nm R/[%] | 27.4 | 25.6 | 23.8 | 22.6 |
| L* | 24.4 | 19.6 | 18.3 | 17.7 |
| a* | 4.9 | 5.3 | 5.8 | 6.1 |
| b* | 1.9 | 2.7 | 3.4 | 3.8 |
| Grinding (h) | 2 | 2 | 2 | 2 |
| Number of times of coating | 1 | 2 | 3 | 4 |
| Infrared reflectance at wavelength of 850 nm R/[%] | 26.0 | 24.0 | 22.5 | 21.9 |
| L* | 23.3 | 18.7 | 17.9 | 17.7 |
| a* | 6.2 | 6.3 | 6.5 | 6.5 |
| b* | 2.8 | 3.7 | 4.0 | 4.2 |
| Grinding (h) | 4 | 4 | 4 | 4 |
| Number of times of coating | 1 | 2 | 3 | 4 |
| Infrared reflectance at wavelength of 850 nm R/[%] | 24.8 | 22.3 | 21.1 | 20.0 |
| L* | 22.9 | 18.2 | 17.8 | 17.8 |
| a* | 6.6 | 6.5 | 6.7 | 6.6 |
| b* | 3.2 | 3.8 | 4.3 | 4,3 |
| Grinding (h) | 6 | 6 | 6 | 6 |
| Number of | 1 | 2 | 3 | 4 |
| Infrared reflectance at wavelength of 850 nm R/[%] | 19.0 | 17.5 | 16.0 | 15.7 |
| L* | 22.0 | 18.3 | 18.0 | 17.7 |
| a* | 6.9 | 6.1 | 6.1 | 6.0 |
| b* | 3.9 | 3.7 | 3.7 | 3.9 |

Reference Example 5

(Adjustment of Color Specifications)

it is important to adjust an ink of a specified color according to use. The recipes of an ink are required to be designed so as to easily fall in the specified color specifications within the allowable ranges of raw material variation, mixing accuracy, and process. The grinding step and coating film thickness are two methods for controlling the CIE color values (L*, a*, b*). Another method for satisfying the color specifications includes adding an inorganic and/or organic pigment and dye.

The non-reflecting ink ABS2 of Reference Example 2 has a reference color, and an infrared reflecting ink was adjusted based on the color values of this color as target values. Also, a pigment was added to the infrared reflecting ink so as to fall within the following tolerance specifications. The tolerance specifications include the L* value=22.5 (±5 and more preferably ±2.5), the a* value=0 (±2 and more preferably 11), and the b* value=−1 (±2 and more preferably ±1).

The ink 2D of Reference Example 2 has excellent total reflectance and thus is set at the start of basic processing and production process. The ink 2D was again prepared as ink 5A, and all inks of Reference Example 5 were prepared by the same method as the inks of Reference Example 2.

On the basis of the color values of an ink having lower L* than the target and higher a* and b*, an infrared reflecting pigment manufactured by The Shepherd Color Company was selected. It was estimated that the L* value can be increased by partially substituting a black pigment with green and blue pigments. Similarly, a* and b* were decreased by substituting a portion of the black pigment with green and blue pigments, respectively. The infrared reflecting inorganic green pigment and blue pigment GR30C654 and BL211 were determined based on the color profile obtained by a maker and a plurality of comparative test results with other inorganic black, green, and blue pigments. Table 3 shows the CIE color values (L*, a*, b*) and infrared reflectance R/[%] at a wavelength of 850 nm which were obtained by two-layer coating of each of the inks having different pigment mixing ratio on PET.

Inks 5B to 5E do not satisfy the target color specifications, but all inks 5F, 5G, and 5R satisfy the color reference. The infrared reflectance R/[%] at a wavelength of 850 nm of all coating films are slightly lower than that of 5A as a reference, but the coating films still satisfy the requirement described in Reference Example 2 that the reflectance difference (ΔR) is 15% or more. Within the mixing ranges of 5F, 5G, and 5H, all color values fall within the specifications. A difference in the amount of black pigment added between 5F and 5H is about 2%, while the differences in the amount of the green pigment and the blue pigment are 1.4% and 0.5%, respectively. This indicates that even in the production process possibly causing error in the amount of pigment added, proper mixing can be obtained without easily causing a change in color specifications.

Table 3 shows the results of evaluation of a pigment mixing ratio [%] for achieving L*=22.5 (±5 and more preferably ±2.5), a*=0 (2 and more preferably ±1), and b*=−1 (±2 and more preferably ±1).

TABLE 3

| Ink | 5A | 5B | 5C | 5D | 5E | 5F | 5G | 5H |
|---|---|---|---|---|---|---|---|---|
| Pigment mixing ratio % | | | | | | | | |
| BK10P950 | 20.00 | 11.20 | 5.60 | 7.53 | 10.10 | 12.15 | 11.20 | 10.20 |
| GR30C654 | | 4.00 | 6.50 | 4.57 | 2.00 | 2.00 | 2.40 | 3.40 |
| BL211 | | 4.80 | 7.90 | 7.90 | 7.90 | 5.85 | 6.40 | 6.40 |
| CIE color values (L*, a*, b*) and reflectance at wavelength of 850 nm R | | | | | | | | |
| L* | 17.7 | 21.5 | 25.3 | 24.0 | 22.0 | 21.2 | 21.5 | 23.0 |
| a* | 7.4 | 1.8 | −6.1 | −3.1 | 0.0 | 0.9 | 0.8 | 0.1 |
| b* | 4.6 | 1.2 | −0.7 | −1.1 | −2.3 | −1.4 | −1.0 | −0.6 |
| R/[%] | 28.3 | 28.2 | 26.7 | 26.7 | 26.3 | 27.1 | 27.2 | 27.2 |

Figure 7:
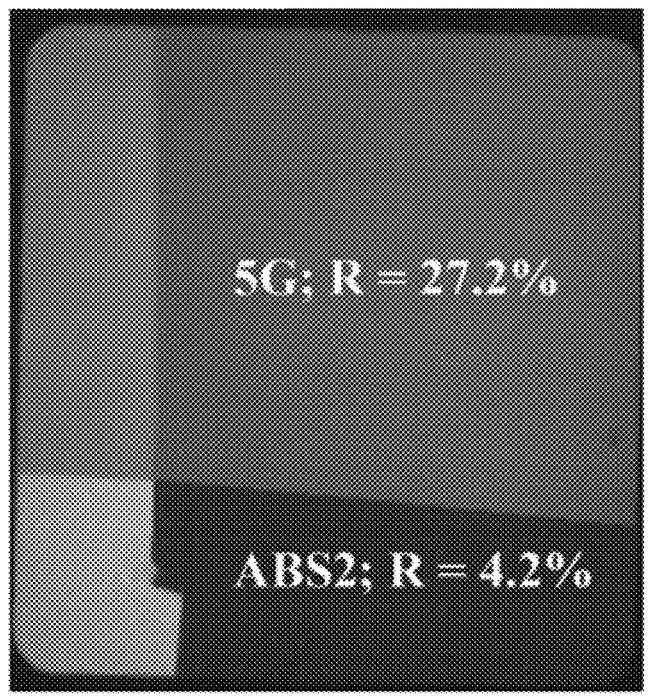
FIG. 7 is a photograph of an infrared reflecting 5G-coated substrate (gray) and an ABS2 substrate (black) having the same CIE color values (L*, a*, b*), which is taken at a distance of 50 cm from the top of a table (white at the lower left) by using an infrared camera.
Figure 8:
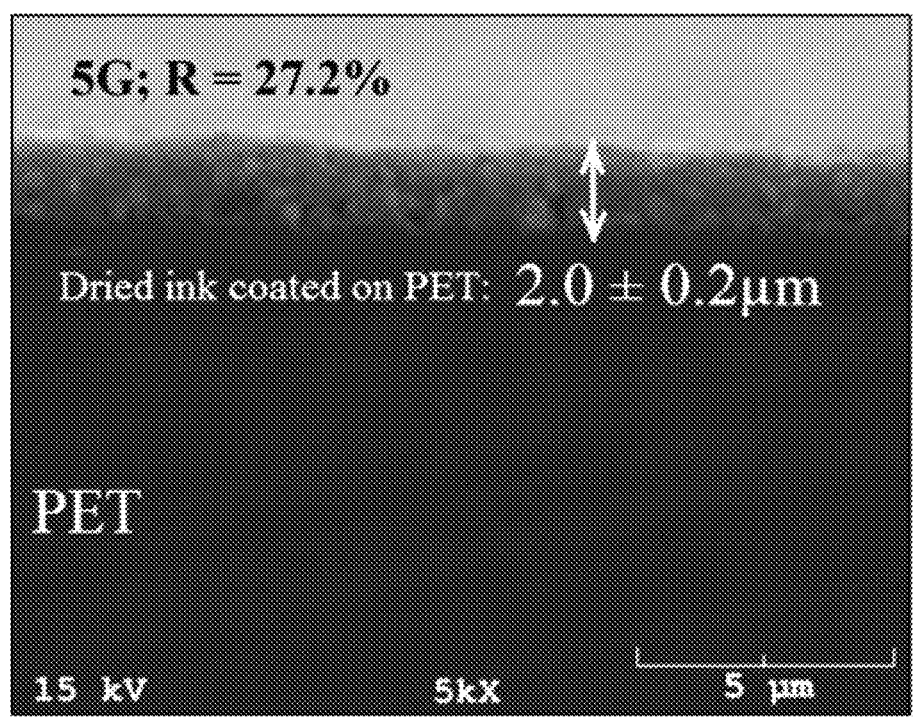
FIG. 8 is a scanning electron microscope (referred to as "SEM" hereinafter) photograph of a section of an infrared reflecting layer having a thickness of 2.0±0.2 μm on PET.

FIG. 7 shows that the boundary between a black substrate and an infrared reflecting black substrate having substantially the same CIE color values (L*, a*, b*) can be discriminated. In FIG. 7, a 5G coating film (L*=21.5, a*=0.8, b*=−1.0) is photographed on an ABS2 coating film (L*=22.5, a*=0.0, b*=−1.0). FIG. 7 displays the contrast between the ABS2 coating film and the 5G coating film under infrared light by using the conditions of Reference Example 2 (distance of 50 cm, vertical incident light). With a reflectance difference (ΔR) of 23.0%, the boundary between materials can be easily discriminated. In order to observe in further detail a coating film, FIG. 8 shows a SEM sectional view of a 5G coating film having a thickness of 2 μm on a PET substrate.

Reference Example 6

(Functionalizing Coating Film Additive)

There may be the necessity to add a further function to each of the infrared reflecting layers with the adjusted colors described above in the reference examples. Specifically, examples of a function include, but are not limited to, low gloss, abrasion resistance, high adhesion, low frictional coefficient, and other performance requirements for given application. In order to add a function, two approaches can be used. A first one is to enhance the characteristics by adding an additional material to an ink composition. Alternatively, a transparent top coat layer to which a functional material is added is coated on the infrared reflecting layer.

In the former example, an ink is mixed with a silica-based matte agent at a ratio of each of 0%, 1%, 2%, and 4% of a mixture. The ink is prepared as shown in Reference Example 1 before the matte agent is added. The ink is ground for 2 hours by each of both grinding media. Then, the matte agent is added to the ink and mixed at 2000 rpm for 10 minutes by a Dispermat mixture using a Cowless blade.

Table 4 shows the values of glossiness, surface roughness (Ra), and infrared reflectance R/[%] vs. the mixing ratio (%) of the gloss-decreasing matte agent. When the amount of the matte agent added is increased, glossiness is decreased by increasing surface roughness (Ra). The surface roughness more scatters the reflection of light. The infrared reflectance R/[%] remains relatively unchanged due to the presence of the matte agent. The direct reflectance in a visible spectrum is decreased, but there is little influence on the quantitative test at a wavelength of 850 nm using an infrared camera described in Reference Example 2.

TABLE 4

| Mixing ratio of gloss decreasing matte agent (%) | 0 | 1 | 2 | 4 |
|---|---|---|---|---|
| Glossiness Gu | 28 | 14.8 | 85 | 1.6 |
| Infrared reflectance at wavelength of 850 nm R/[%] | 26.5 | 26.2 | 25.6 | 27.2 |

Reference Example 7

(Alternative Structure of Infrared Reflecting Tape)

The infrared reflecting layer described above in each of the reference examples can be applied to an ink for coating a base material, particularly an adhesive tape. The same effect can be obtained by an infrared reflecting structure using the same inorganic pigment. A tape has three layers including a black or color coating film layer (upper) having a thickness of 1 to 10 μm, a base layer (middle), and an adhesive layer (lower). A release liner is used for protecting the adhesive layer, but is removed in a final step.

Reference Example 8

(Influence of Diameter of Grinding Media on Total Reflectance and Color) By using MiniMotor Mill 250 manufactured by Eiger Machinery, Inc., Chicago, Illinois, which is filled with 80% of yttria stabilized zirconia (YTZ (registered trademark)) ginding media having a grinding media diameter of each of 0.5 mm, 0.8 mm, 1.0 mm, 1.25 mm, and 1.5 mm, 750 g of an ink base listed in Table 5 was ground. A sample of Reference Example 8A was periodically collected and mixed in an ink according to Reference Example 8B in Table 5.

TABLE 5

| | Ex. 8A Ink base % | Ex. 8B Ink % |
|---|---|---|
| Varnish: 25% Mowital B161-1175% 60/40 ethanol/N-propyl acetate mixture | 64 | 45 |
| BK 10P950 (Shepherd Color Co.) | 18 | 10 |
| BL 211 (Shepherd Color Co.) | 12.24 | 6.8 |
| GR 30C654 (Shepherd Color Co.) | 5.76 | 3.2 |
| 60/40 ethanol/N-propyl acetate mixture | | 34.5 |
| Z-6020 silane (Dow) | | 0.5 |
| Total | 100.00 | 100.00 |

The ink was applied in two and three layers on a PET substrate of Tekra Melinex 454 of 125 μm by using Geiger Gravure Printing Press using a gravure cylinder (150 LPI) having pyramid-shaped cells. The results for each of the diameters of the YTZ (registered trademark) grinding media indicate that reflectance increases at each time of printing and decreases with the grinding time. The glossiness increases with both the number of times of printing and the grinding time. The L* value decreases with both the grinding time and the number of times of printing. The a* value and b* value increase with the grinding time.

FIG. 10A, FIG. 10B, FIG. 10C, FIG. 10D, and FIG. 10E show the infrared reflectance R/[%] at a wavelength of 850 nm, glossiness Gu, CIE color values (L*, a*, b*), respectively, when inks ground by using the grinding media having different diameters were coated in two layers. Comparison therebetween shows that the infrared reflectance R decreases in the order of 0.5 mm>0.8 mm>(1.25 mm≠1.0 mm≠1.5 mm). The glossiness Gu increases in the order of 0.5 mm>0.8 mm>1.0 mm>1.25 mm>1.5 mm. The CIE color value (L*) decreases in the order of 0.5 mm>0.8 mm>1.0 mm>1.25 mm>1.5 mm. The CIE color values (a*, b*) increase in the order of 0.5 mm>0.8 mm>1.0 mm>1.25 mm>1.5 mm.

Reference Example 9

(Influence of Eiger Grinding Time on Total Reflectance and Color Tone)

By using MiniMotor Mill 250 manufactured by Eiger Machinery, Inc., Chicago, Illinois, which was filled with 80% of YTZ (registered trademark)) grinding media having a media diameter of 0.8 mm, 750 g of an ink base of Reference Example 9A in Table 6 was ground.

TABLE 6

|  | Ex. 9A Ink base % | Ex. 9B Ink % |
|---|---|---|
| Varnish: 25% Mowital B16H/75% 60/40 ethanol/N-propyl acetate mixture | 54.471 | 39.368 |
| BK 10P950 | 30.09 | 13.125 |
| BL 211 | 9.428 | 4.113 |
| GR 30C654 | 0.602 | 0.263 |
| Keyfast Blue 6G-SS (Keyfast Aniline Corp) | 2.658 | 1.159 |
| 60/40 ethanol/N-propyl acetate mixture |  | 39.774 |
| Z-6020 silane |  | 1 |
| BYK 410 | 0.459 | 0.2 |
| Disper BYK 2117 (BYK) | 2.293 | 1 |
| Total | 100 | 100 |

The ink was applied in two layers, three layers, and four layers on a transparent PET substrate of 125 μm by using Geiger Gravure Printing Press using a gravure cylinder (150 LPI) having pyramid-shaped cells. FIG. 11A, FIG. 11B, FIG. 11C, FIG. 11D, and FIG. 11E show the infrared reflectance R/[%] at a wavelength of 850 nm, glossiness Gu, the L* value, a* value, and b* value, respectively, vs. the grinding time and the number of times of printing. The reflectance increases with the number of times of printing and decreases with the grinding time. The glossiness (gloss value) decreases with both the grinding time and the number of times of printing. The L* value decreases with both the grinding time and the number of times of printing. The a*, b* values increase with the grinding time. The b* value exceeds 0 by grinding for 40 minutes or more.

Reference Example 10

(Influence of Basket Grinding on Total Reflectance and Color)

By using HockMeyer HCPS-1/4 Immersion Mill having YTZ (registered trademark)) grinding media having a grinding media diameter of 0.5 mm, 12 kg of an ink base of Reference Example 10A listed in Table 7 was ground. A sample of the ground ink base was periodically collected and mixed in an ink of reference example 10B.

TABLE 7

|  | Ex. 10A Ink base % | Ex. 10B Ink % |
|---|---|---|
| Varnish: 25% Mowitai B16H/75% 60/40 ethanol/N-propyl acetate mixture | 61.115 | 43.4 |
| BK 10P950 | 27.54 | 15.3 |
| BL 211 | 8.46 | 4.7 |
| Keyfast Blue 6G-SS | 2.385 | 1.325 |
| 60/40 ethanol/N-propyl acetate mixture |  | 33.997 |
| Z-6020 silane |  | 1 |
| BYD D 410 (BYK) | 0.5 | 0.278 |
| Total | 100.000 | 100.000 |

Figure 12:
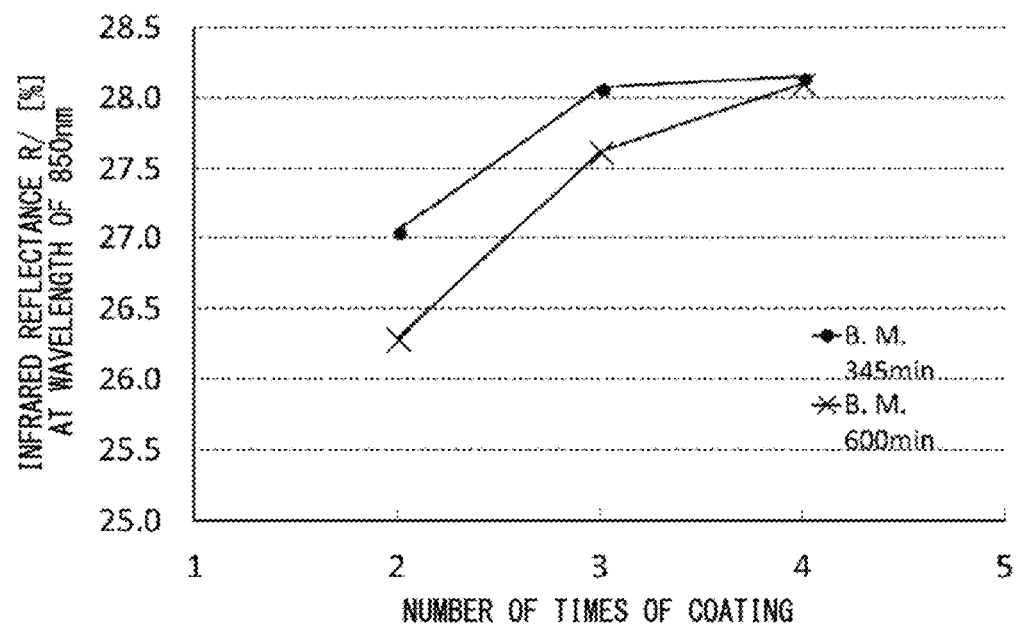
FIG. 12 is a graph showing the relationships of infrared reflectance R/[%] at a wavelength of 850 nm to the number of times of coating when the grinding time is changed.

The ink was applied in two layers, three layers, and four layers on PET with a thickness of 125 μm by using Geiger Gravure Printing Press. FIG. 12 shows the infrared reflectance R/[%] at a wavelength of 850 nm. The infrared reflectance R increases with the number of times of printing and decreases with the grinding time.

Reference Example 11

(Influence of Pigment Mixing Ratio (%) on Total Reflectance, Glossiness, and Color)

By using HockMeyer HCPS-1/4 Immersion Mill having 0.5-mm YTZ (registered trademark)) grinding media, 12 kg of an ink base of Reference Example 11 was ground for 10 hours. The ratios of an inorganic pigment in Reference Examples 11A, 11B, 11C, 11D, and 11E were 15%, 17.5%, 20%, 21%, and 22%, respectively.

TABLE 8

|  | Base composition | Ink composition | | | | |
|---|---|---|---|---|---|---|
| Ink/base ID | Ex 11 % | Ex. 11A % | Ex. 11B % | Ex. 11C % | Ex. 11D % | Ex. 11E % |
| Varnish: 25% Mowital B16H/75% 60/40 ethanol/N-propyl acetate mixture | 61.115 | 49.400 | 46.100 | 43.400 | 43.400 | 43.400 |
| BK 10P950 | 27 | 11.250 | 13.125 | 15.000 | 15.750 | 16.500 |
| BL 211 | 8.46 | 3.525 | 4.113 | 4.700 | 4.935 | 5.170 |
| GR 30C654 | 0.54 | 0.225 | 0.263 | 0.300 | 0.315 | 0.330 |
| Keyfast Blue 6G-SS | 2.385 | 0.994 | 1.159 | 1.325 | 1.391 | 1.458 |
| 60/40ehtanol/N-propyl acetate mixture |  | 33.398 | 33.997 | 33.997 | 32.917 | 31.837 |
| Z-6020 silane |  | 1.000 | 1.000 | 1.000 | 1.000 | 1.000 |
| BYK D410 | 0.5 | 0.209 | 0.243 | 0.278 | 0.292 | 0.306 |
| Total | 100 | 100.000 | 100.000 | 100.000 | 100.000 | 100.000 |
| Mixing ratio of Shepherd inorganic pigment in ink (%) |  | 15.0 | 17.5 | 20 | 21 | 22 |

Each of the five types of inks was applied three times on PET of 125 μm by using Geiger Gravure Printing Press. Table 9 shows the infrared reflectance R at a wavelength of 850 nm, glossiness Gu, and CIE color values (L*, a*, b*). When the mixing ratio of the inorganic pigment is within a range 15% to 20%, the L* value increases by about 0.5 per percent increase of the pigment, while when the mixing ratio of the pigment is within a range of 20% to 22%, the rate of increase is decreased. When the mixing ratio of the pigment is within a range 15% to 20%, the a* value increases by about 0.1 per percent increase of the pigment. When the mixing ratio of the pigment is within a range 15% to 20%, the b* value decreases by about 3.5 per percent increase of the pigment. When the mixing ratio of the inorganic pigment is within a range 15% to 22%, the infrared reflectance at a wavelength of 850 nm changes only by less than 1%.

Figure 9:
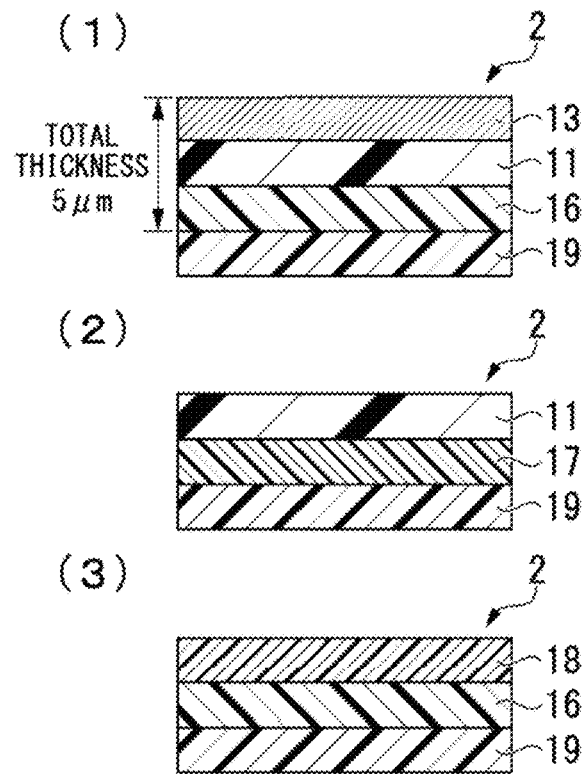
FIG. 9 is a sectional view showing three forms of an infrared reflecting black sheet. A form (1) has an infrared reflecting layer, PET (middle), and an adhesive layer. A form (2) has a PET film (upper) on an infrared reflecting pigment-filled adhesive layer. A form (3) has an adhesive layer (bottom) containing an infrared reflecting pigment kneaded into PET.
Figure 10A:
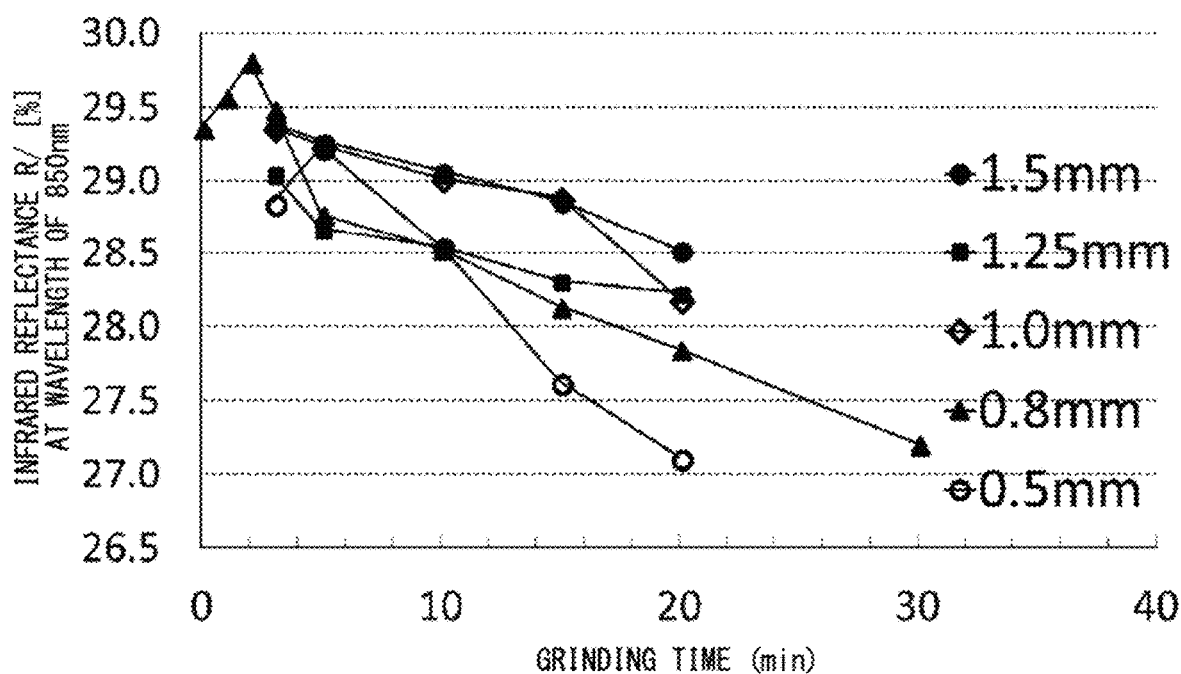
FIG. 10A is a graph showing the relationships of infrared reflectance R/[%] at a wavelength of 850 nm to grinding time when the diameter of YTZ (registered trademark) grinding media is changed.
Figure 10B:
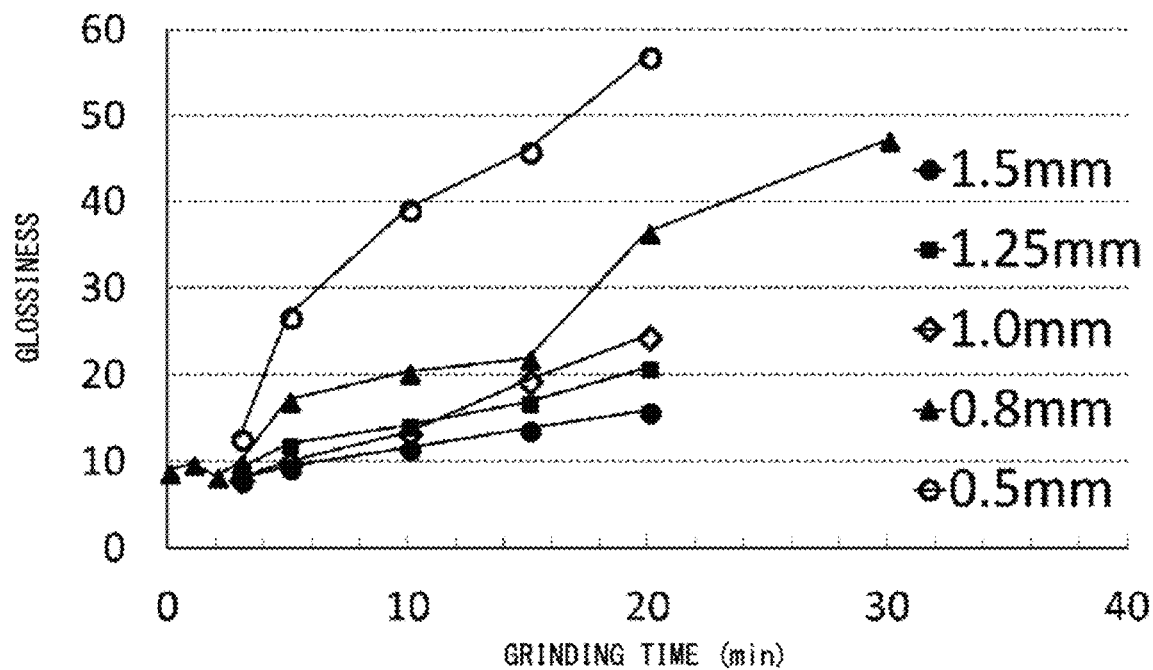
FIG. 10B is a graph showing the relationships of glossiness to grinding time when the diameter of YTZ (registered trademark) grinding media is changed.
Figure 10C:
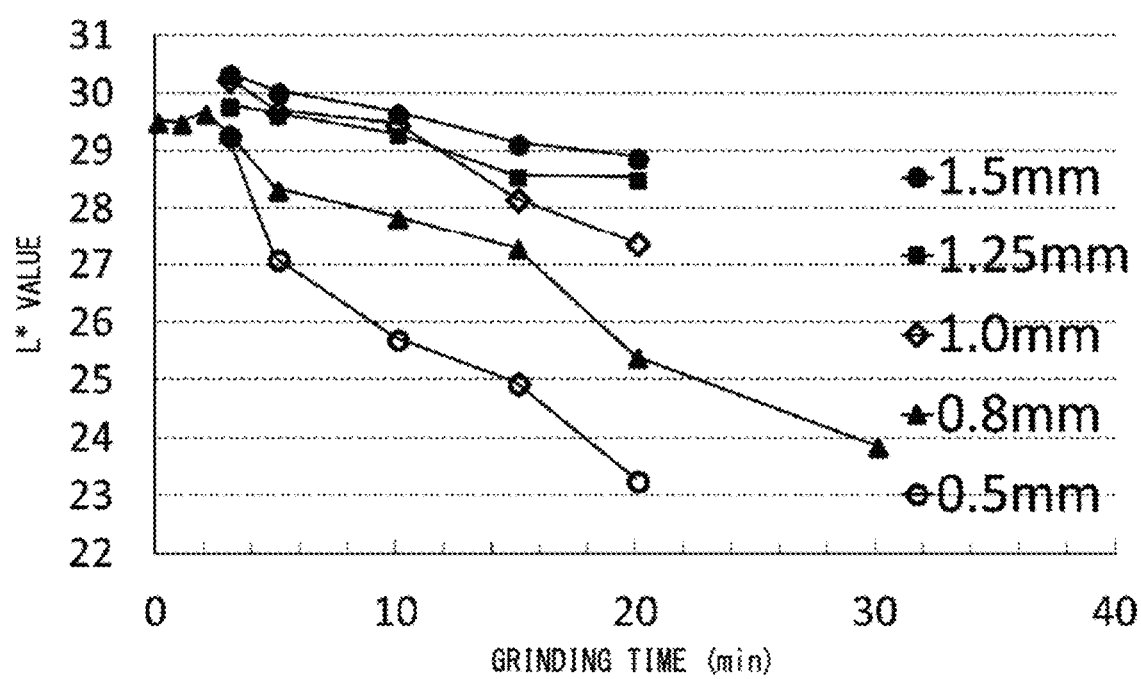
FIG. 10C is a graph showing the relationships of CIE color value (L*) to grinding time when the diameter of YTZ (registered trademark) grinding media is changed.
Figure 10D:
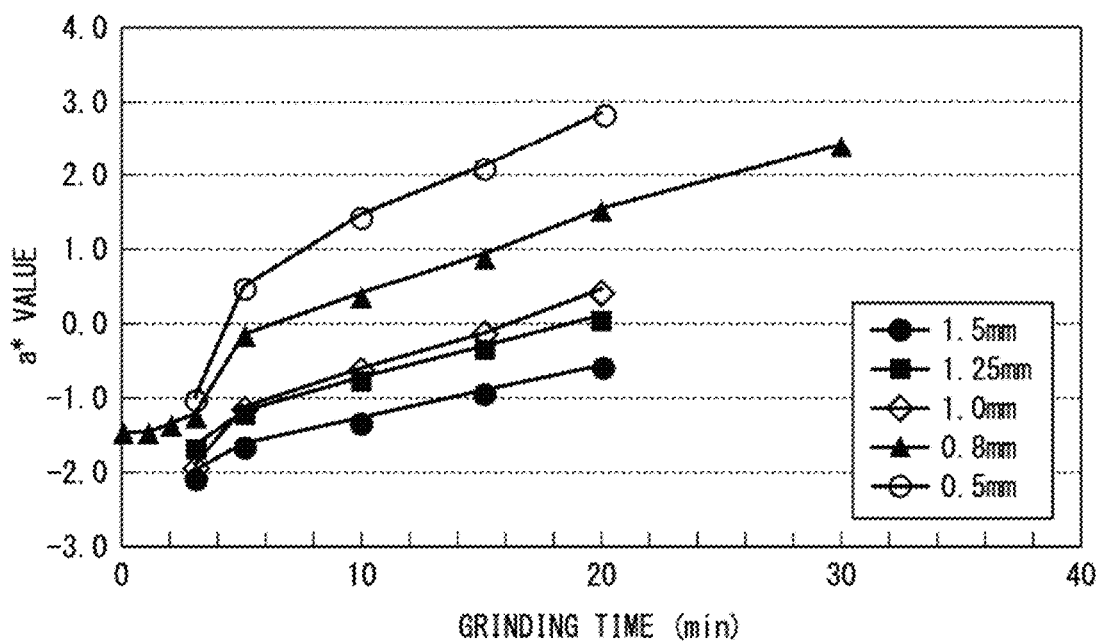
FIG. 10D is a graph showing the relationships of CIE color value (a*) to grinding time when the diameter of YTZ (registered trademark) grinding media is changed.
Figure 10E:
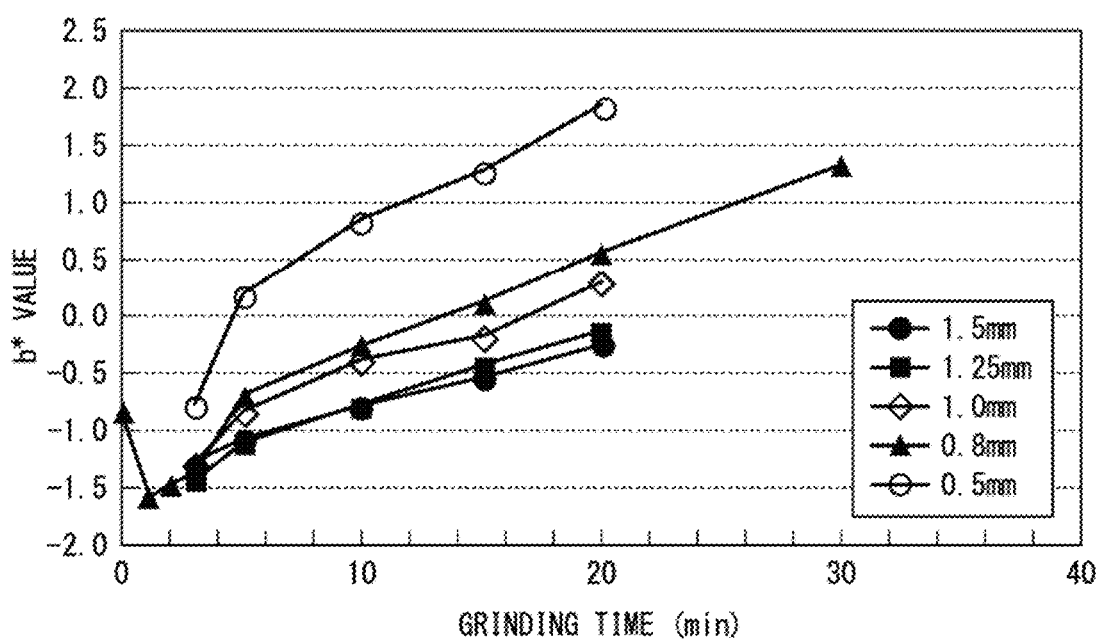
FIG. 10E is a graph showing the relationships of CIE color value (b*) to grinding time when the diameter of YTZ (registered trademark) grinding media is changed.
Figure 11A:
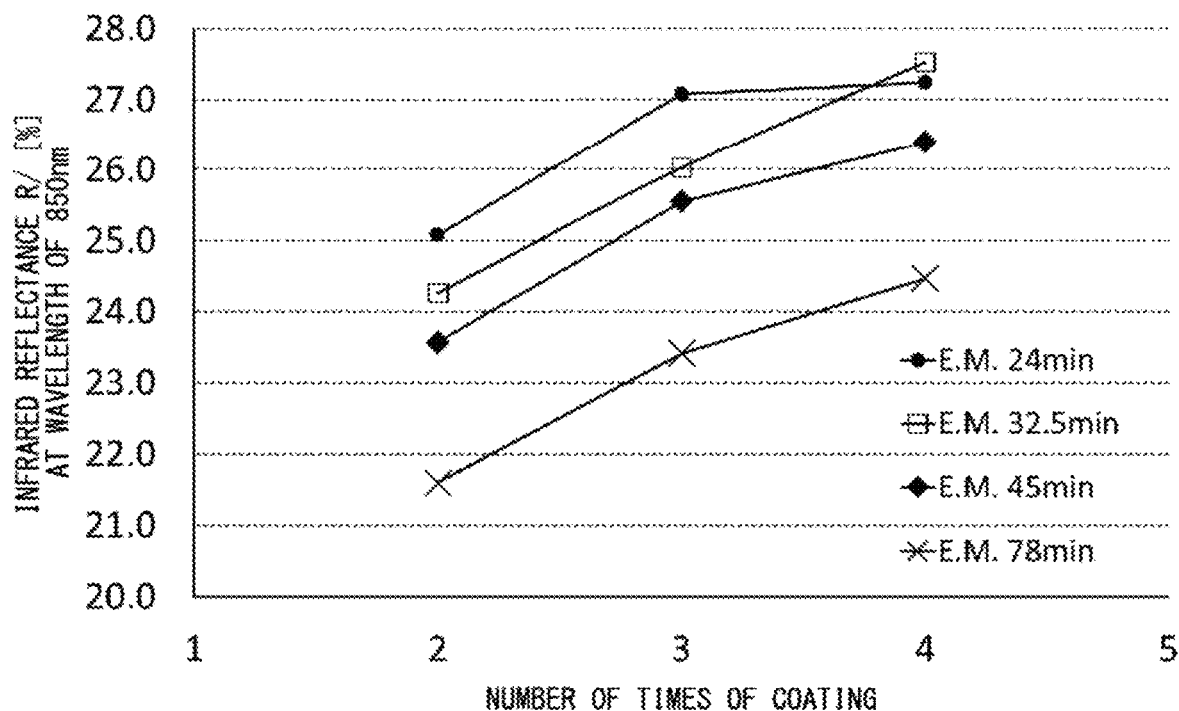
FIG. 11A is a graph showing the relationships of infrared reflectance R/[%] at a wavelength of 850 nm to the number of times of coating when the grinding time is changed.
Figure 11B:
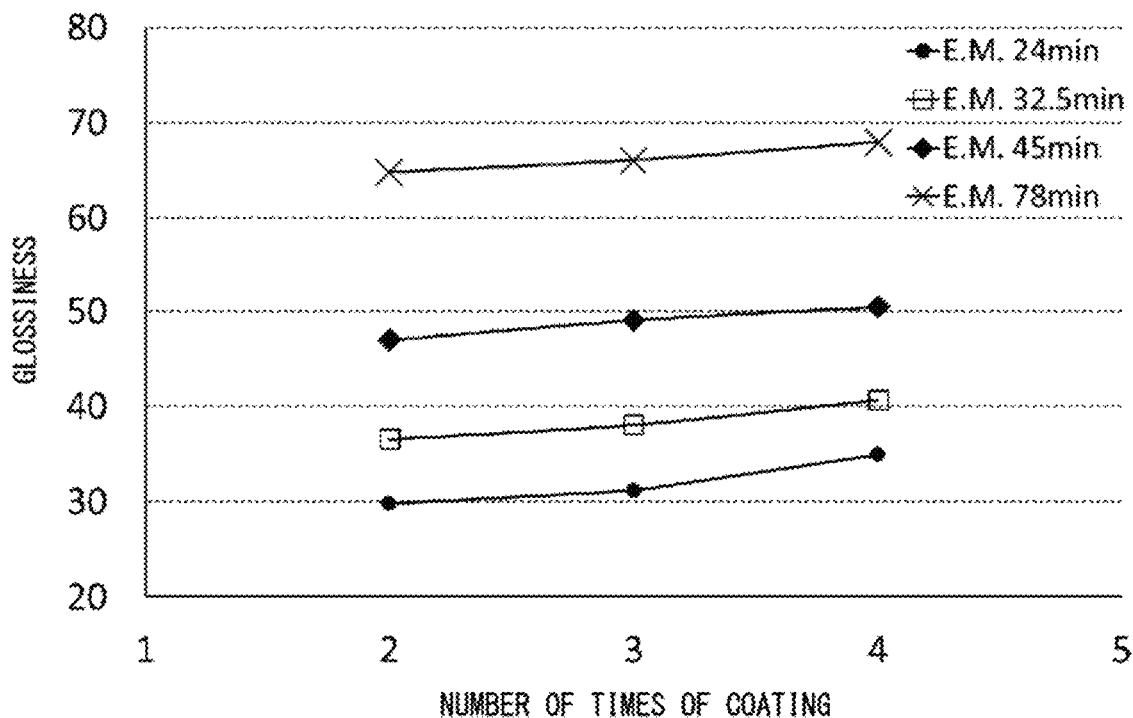
FIG. 11B is a graph showing the relationships of glossiness Gu to the number of times of coating when the grinding time is changed.
Figure 11C:
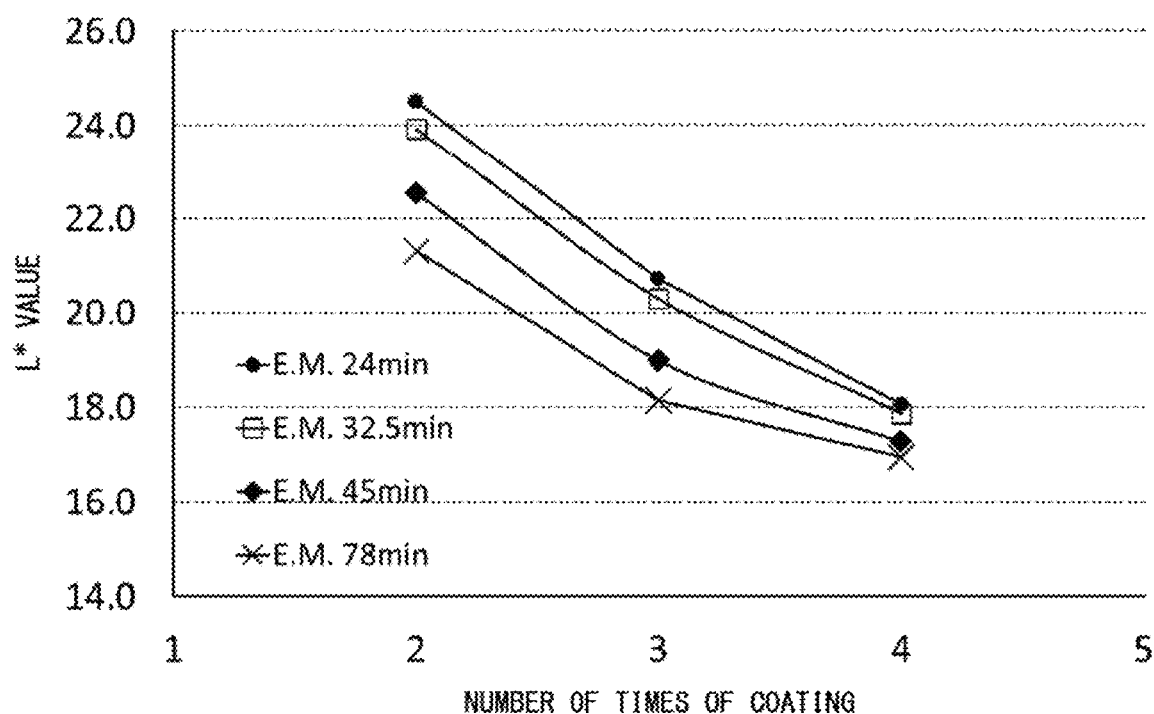
FIG. 11C is a graph showing the relationships of CIE color value (L*) to the number of times of coating when the grinding time is changed.
Figure 11D:
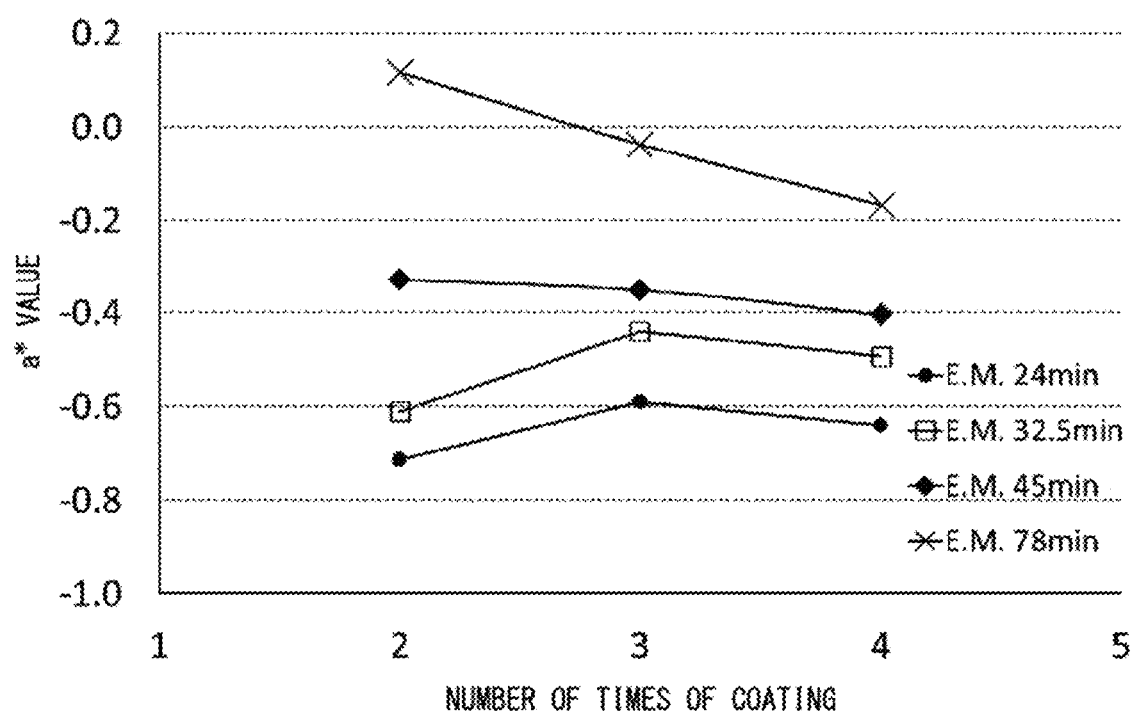
FIG. 11D is a graph showing the relationships of CIE color value (a*) to the number of times of coating when the grinding time is changed.
Figure 11E:
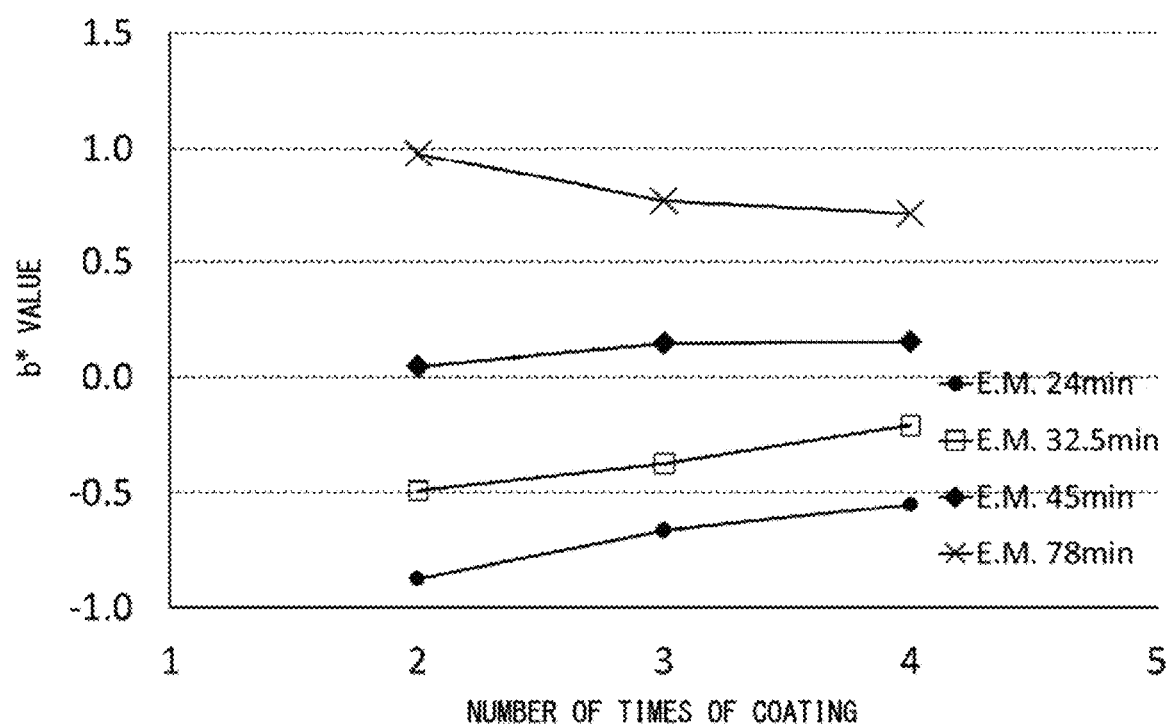
FIG. 11E is a graph showing the relationships of CIE color value (b*) to the number of times of coating when the grinding time is changed.

An infrared reflecting pigment can be added to a base material or an adhesive layer in an alternative laminated structure enabling discrimination of a boundary. As discussed in Reference Example 6, no problem occurs even when the two alternative approaches are applied to a layer other than the top coat layer unless a functionalized coating film is required. As well as two alternative approaches, the original configuration is shown by forms (1), (2), and (3) in FIG. 9. The forma (1) in FIG. 9 has an infrared reflecting layer, PET (middle), and an adhesive layer. The form (2) in FIG. 9 has a PET film (upper) on an infrared reflecting pigment-filled adhesive layer. The form (3) in FIG. 9 has an infrared reflecting pigment kneaded into a PET film having an adhesive layer (bottom).

TABLE 9

| Ink ID | Ex. 11A | Ex. 11B | Ex. 11C | Ex.11D | Ex. 11E |
|---|---|---|---|---|---|
| Mixing ratio of Shepherd inorganic pigment in ink (%) | 15 | 17.5 | 20 | 21 | 22 |
| Viscosity at shear rate of 26.4/s (cP) | 52.5 | 44.1 | 49.5 | 47.7 | 53.4 |
| Infrared reflectance at wavelength of 850 nm R/[%] | 27.6 | 28.1 | 28.1 | 28.5 | 27.8 |
| Glossiness Gu | 45.2 | 36.1 | 27 | 26.7 | 24.4 |
| L* | 19.1 | 20.1 | 21.6 | 21.8 | 21.8 |
| a* | −0.9 | −0.6 | −0.5 | −0.5 | −0.5 |
| b* | −0.6 | −0.8 | −1.1 | −1.1 | −1.2 |

Reference Example 12

(Influence of Different Pigments on Total Reflectance, Glossiness, and Color)

By using Silverson Machines Ltd. Waterside, Chesham, Bucks, UK, Model-L2AIR Rotor Stater Mixer, 135 g of each of inks shown in Table 10 was ground at 5000 RPM for 1 hour.

TABLE 10

| Ink ID | Ex. 12A % | Ex. 12B % |
|---|---|---|
| Varnish: 25% Mowital B16H/75% 60/40 ethanol/N-propyl acetate mixture | 51 | 50 |
| BASF Sicopal Black L 0095 | | 25 |
| BK 10P950 | 25 | |
| 60/40 ethanol/N-propyl acetate mixture | 24 | 25 |
| Total | 100 | 100 |

Each of the inks was applied three times on PET of 125 μm by using Geiger Gravure Printing Press using a 200-LPI gravure cylinder. Table 11 shows the color characteristics. It is found that Shepherd BK 10P950 and BASF Sicopal Black L 0095 are suitable for infrared reflection application, and Shepherd BK 10P950 is more preferred because of its high reflectance.

TABLE 11

| Ink ID | Ex. 12A | Ex. 12B |
|---|---|---|
| Infrared reflectance at wavelength of 850 nm R/[%] | 26.1 | 21.0 |
| L* | 23.9 | 26.2 |
| a* | 3.6 | 1.7 |
| b* | 1.5 | 0.7 |

EXAMPLES (Polyurethane Resin A)

In a four-neck flask provided with a stirrer, a thermometer, a reflux condenser, and a nitrogen gas inlet tube, 192.9 parts of polyester polyol, having a number-average molecular weight (referred to as "Mn" hereinafter) of 2,000 and obtained by an acid component composed of adipic acid/terephthalic acid=50/50 and 3-methyl-1,5-pentanediol, 15.8 parts of 1,4-butanediol, and 77.9 parts by isophorone diisocyanate were added, and reacted in a nitrogen stream at 90° C. for 15 hours. Then, 11.0 parts of isophorone diamine, 2.4 parts of di-n-butylamine, and 700 parts of methyl ethyl ketone were added and reacted under stirring at 50° C. for 4 hours, producing a polyurethane resin A having a resin solid content concentration of 30.0%, Gardner viscosity U (25° C.), amine value=0, and a mass-average molecular weight of 30,000.

(Black Ink A)

A black ink A was prepared by adding 5 parts of curing agent "Sumidur N3300" manufactured by Sumitomo Bayer Urethane Co., Ltd. and 40 parts of diluent "NH-NT DC solvent" manufactured by DIC Graphics Corporation were added to a dispersion produced by adding 10 parts of a near-infrared reflecting pigment "Chromofine Black A1103" (1-{4-[(4,5,6,7-tetrachloro-3-oxoisoindolin-1-ylidene) amino]phenylazo}-2-hydroxy-N-(4'-methoxy-2'-methylphenyl)-11H-benzo[a]carbazole-3-carboxamide) (CAS No.: 103621-96-1) manufactured by Dainichiseika Color & Chemicals Mfg. Co., Ltd., 5 parts of "Sylophobic 704" manufactured by Fuji Silysia Co., Ltd. (silane coupling treatment: average particle diameter of 3.5 μm according to the Coulter counter method), 2 parts of "Tospearl 2000B" (spherical silicone resin beads: average particle diameter of 6 μm according to a Coulter counter method) manufactured by Momentive Performance Materials, Inc., 2 parts of "Luwax AF29 Micropowder" (polyethylene fine powder wax) manufactured by BASF Corporation, 1 part of "Solsperse 24000GR" manufactured by Lubrizol Corporation, 55 parts of the polyurethane resin A (polyurethane resin) (N.V. 30%), 13 parts of methyl ethyl ketone, 9 parts of ethyl acetate, 5 parts of isopropyl alcohol, and 5 parts of polypropylene glycol monomethyl ether, and then wet-dispersing the resultant mixture by a sand mill for about 1 hour.
(Black Ink B)

By using Eiger Mill (Model: MiniMotor Mill 250 manufactured by Eiger Machinery Inc., Chicago, Illinois), 700 g of the ink base of Reference Example 11 was ground by 0.8-mm yttria-stabilized zirconia (YTZ (registered trademark)) media for 20 minutes. Then, the ink base of Reference Examples 11 was mixed in an ink according to black ink B shown in Table 12.

TABLE 12

| Ink/base ID | Base composition Ex 11 % | Ink composition Black ink B % |
|---|---|---|
| Varnish: 25% Mowital B16H/75% 60/40 ethanol/N-propyl acetate mixture | 61.115 | 43.58 |
| BK 10P950 | 27 | 15.00 |
| BL 211 | 8.46 | 4.70 |
| GR 30C654 | 0.54 | 0.30 |
| Keyfast Blue 6G-SS | 2.385 | 1.33 |
| 60/40 ethanol/N-propyl acetate mixture | | 33.81 |
| Z-6020 silane | | 1.00 |
| BYK D410 | 0.5 | 0.28 |
| Total | 100 | 100 |

(Black Ink C)

A black ink C was prepared by the same method as in the production example of the black ink A except that 10 parts of "Special Black 250" (acid carbon) manufactured by Degussa Corporation was used in place of 10 parts of a near-infrared reflecting pigment "Chromofine Black A1103" manufactured by Dainichiseika Color & Chemicals Mfg. Co., Ltd. of the black ink A.
(Preparation of Adhesive A)

First, an acrylic polymer having a weight-average molecular weight of 900,000 was produced by solution polymerization at 80° C. for 8 hours in an ethyl acetate solution using 97.98 parts of n-butyl acrylate, 2 parts of acrylic acid, 0.02 parts of 4-hydroxybutyl acrylate, and 0.2 parts of azobisisobutyronitrile as a polymerization initiator. To 100 parts of the acrylic polymer, 5 parts of polymerized rosin ester (trade name "D-135" manufactured by Arakawa Chemical Industries, Ltd.), 20 parts of disproportionated rosin ester (trade name "KE-100" manufactured by Arakawa Chemical Industries, Ltd.), and 25 parts of petroleum resin (trade name "FTR6100") were added, and ethyl acetate was added to prepare an adhesive solution having a solid content of 40%. Further, 0.8 parts of an isocyanate-based crosslinking agent (trade name "NC40" manufactured by DTC Corporation) was added and mixed by stirring to be made uniform, preparing an adhesive A. The gel fraction was 20%, and the storage elastic modulus at 25° C. was 9×10⁴ Pa.
(Preparation of Adhesive B)

First, an acrylic polymer having a weight-average molecular weight of 900,000 was produced by solution polymerization at 80° C. for 8 hours in an ethyl acetate solution using 97.98 parts of n-butyl acrylate, 2 parts of acrylic acid, 0.02 parts of 4-hydroxybutyl acrylate, and 0.2 parts of azobisisobutyronitrile as a polymerization initiator. To 100 parts of the acrylic polymer, 5 parts of polymerized rosin ester (trade name "D-135" manufactured by Arakawa Chemical Industries, Ltd.), 20 parts of disproportionated rosin ester (trade name "KE-100" manufactured by Arakawa Chemical Industries, Ltd.), and 25 parts of petroleum resin (trade name "FTR6100") were added, and ethyl acetate was added to prepare an adhesive solution having a solid content of 40%. Next, 10 parts of black coloring agent "DICTON black AR8555" (carbon black content: 45% (solid content), resin solid content concentration: 49%) manufactured by DIC Corporation was added and uniformly mixed by the stirrer. Further, 0.8 parts of isocyanate-based crosslinking agent (tradename "NC40" manufactured by DIC Corporation) was added and mixed by stirring to be made uniform, preparing an adhesive A. The gel fraction was 20%, and the storage elastic modulus at 25° C. was 9×10⁴ Pa.

Example 1

The black ink A was coated on polyester film F53 Lumirror #3.5 (thickness: 3.5 μm) manufactured by Toray Industries, Inc. by gravure coating so that the dry thickness of an ink film portion was 1.0 μm, and then dried at 100° C. for 1 minute to form a black film having an infrared reflecting layer composed of the black ink A. The thickness of the ink coating film portion of the infrared reflecting layer was measured by cutting the film with a razor and observing a section with a microscope at a magnification of 2500 times.

Next, OS-M suede OP varnish manufactured by Dainichiseika Color & Chemicals Mfg. Co., Ltd. was used as a matte agent and coated by gravure coating on the infrared reflecting layer side of the black film so that the thickness of a matte layer was 1.5 μm, dried at 100° C. for 1 minute, aged at 40° C. for 2 days to produce a black sheet according to Example 1. The total thickness of the black sheet according to Example 1 was 6.5 μm.

The adhesive A was coated by gravure coating on a release film (trade name "PET38×1K0") manufactured by Nippa Corporation so that the dry thickness was 2 μm, dried at 100° C. for 1 minute, bonded to the non-ink surface of the black sheet according to Example 1, and further aged at 40° C. for 2 days to produce a black adhesive tape according to Example 1. The total thickness of the black adhesive tape according to Example 1 was 8.0 μm.

Example 2

A black sheet according to Example 2 was produced by the same method as for the black sheet according to Example 1 except that the dry thickness of the ink film portion of the black sheet according to Example 1 was changed to 1.5 μm. The total thickness of the black sheet according to Example 2 was 6.5 μm.

A black adhesive tape according to Example 2 was produced by the same method as for the black adhesive tape according to Example 1 except that the black sheet according to Example 1 in the black adhesive tape according to Example 1 was changed to the black sheet according to Example 2. The total thickness of the black adhesive tape according to Example 2 was 8.5 μm.

Example 3

"NB-300 white" manufactured by Dainichiseika Color & Chemicals Mfg. Co., Ltd. was coated by gravure coating on polyester film F53 Lumirror #3.5 (thickness: 3.5 μm) manufactured by Toray Industries, Inc. so that the dry thickness of an ink film portion was 1.0 μm, and then dried at 100° C. for 1 minute to form a white film having a white infrared reflecting layer.

Next, the black ink A was coated by gravure coating on the white infrared reflecting layer side of the white film so that the thickness of an ink film portion was 1.0 μm and dried at 100° C. for 1 minute to produce a black film having a black infrared reflecting layer composed of the black ink A and the white infrared reflecting layer.

Next, OS-M suede OP varnish manufactured by Dainichiseika Color & Chemicals Mfg. Co., Ltd. was used as a matte agent and coated by gravure coating on the black infrared reflecting layer side of the black film so that the thickness of a matte layer was 1.5 μm, dried at 100° C. for 1 minute, aged at 40° C. for 2 days to produce a black sheet according to Example 3. The total thickness of the black sheet according to Example 3 was 7.0 μm.

A black adhesive tape according to Example 3 was produced by the same method as for the black adhesive tape according to Example 1 except that the black sheet according to Example 1 in the black adhesive tape according to Example 1 was changed to the black sheet according to Example 3. The total thickness of the black adhesive tape according to Example 3 was 9.0 μm.

Example 4

A black sheet according to Example 4 was produced by the same method as for the black sheet according to Example 3 except that the thickness of the white infrared reflecting layer of the black sheet according to Example 3 was changed to 2.0 μm. The total thickness of the black sheet according to Example 4 was 8.0 μm.

A black adhesive tape according to Example 4 was produced by the same method as for the black adhesive tape according to Example 3 except that the black sheet according to Example 3 in the black adhesive tape according to Example 3 was changed to the black sheet according to Example 4. The total thickness of the black adhesive tape according to Example 4 was 10.0 μm.

Example 5

A black sheet according to Example 5 was produced by the same method as for the black sheet according to Example 3 except that the thickness of the white infrared reflecting layer of the black sheet according to Example 3 was changed to 3.0 μm. The total thickness of the black sheet according to Example 5 was 9.0 μm.

A black adhesive tape according to Example 5 was produced by the same method as for the black adhesive tape according to Example 3 except that the black sheet according to Example 3 in the black adhesive tape according to Example 3 was changed to the black sheet according to Example 5. The total thickness of the black adhesive tape according to Example 5 was 11.0 μm.

Example 6

A black sheet according to Example 6 was produced by the same method as for the black sheet according to Example 1 except that the polyester film F53 Lumirror #3.5 (thickness: 3.5 μm) manufactured by Mitsubishi Plastics, Inc. of the black sheet according to Example 1 was changed to polyester film K750-2.0W (thickness: 2.0 μm) manufactured by Mitsubishi Plastics, Inc., and the black ink A was changed to the black ink B. The total thickness of the black sheet according to Example 6 was 4.5 μm.

A black adhesive tape according to Example 6 was produced by the same method as for the black adhesive tape according to Example except that the black sheet according to Example 1 in the black adhesive tape according to Example 1 was changed to the black sheet according to Example 6. The total thickness of the black adhesive tape according to Example 6 was 6.0 μm.

Example 7

A black sheet according to Example 7 was produced by the same method as for the black sheet according to Example 6 except that the dry thickness of the ink film portion of the black sheet according to Example 6 was changed to 1.5 μm. The total thickness of the black sheet according to Example 7 was 5.0 μm.

A black adhesive tape according to Example 7 was produced by the same method as for the black adhesive tape according to Example 6 except that the black sheet according to Example 6 in the black adhesive tape according to Example 6 was changed to the black sheet according to Example 7. The total thickness of the black adhesive tape according to Example 7 was 7.0 μm.

Example 8

"NB-300 white" manufactured by Dainichiseika Color & Chemicals Mfg. Co., Ltd. was coated by gravure coating on polyester film K750-2.0W (thickness: 2.0 μm) manufactured by Mitsubishi Plastics, Inc. so that the dry thickness of an ink film portion was 1.0 μm, dried at 100° C. for 1 minute, and then aged at 40° C. for 2 days to form a white film having a white infrared reflecting layer.

Next, the black ink B was coated by gravure coating on the white infrared reflecting layer side of the white film so that the dry thickness of an ink film portion was 1.0 μm, dried at 100° C. for 1 minute, and aged at 40° C. for 2 days to produce a black film having a black infrared reflecting layer composed of the black ink B and a white infrared reflecting layer.

Next, OS-M suede OP varnish manufactured by Dainichiseika Color & Chemicals Mfg. Co., Ltd. was used as a matte agent and coated by gravure coating on the black infrared reflecting layer side of the black film so that the thickness of a matte layer was 1.5 μm and dried at 100° C. for 1 minute to produce a black sheet according to Example 8. The total thickness of the black sheet according to Example 8 was 5.5 μm.

A black adhesive tape according to Example 8 was produced by the same method as for the black adhesive tape according to Example 6 except that the black sheet according to Example 6 in the black adhesive tape according to Example 6 was changed to the black sheet according to Example 8. The total thickness of the black adhesive tape according to Example 8 was 7.5 μm.

Example 9

A black sheet according to Example 9 was produced by the same method as for the black sheet according to Example 8 except that the thickness of the white infrared reflecting layer of the black sheet according to Example 8 was changed to 2.0 μm. The total thickness of the black sheet according to Example 9 was 6.5 μm.

A black adhesive tape according to Example 9 was produced by the same method as for the black adhesive tape according to Example 8 except that the black sheet according to Example 8 in the black adhesive tape according to Example 8 was changed to the black sheet according to Example 9. The total thickness of the black adhesive tape according to Example 9 was 8.5 μm.

Example 10

A black sheet according to Example 10 was produced by the same method as for the black sheet according to Example 8 except that the thickness of the white infrared reflecting layer of the black sheet according to Example 8 was changed to 3.0 μm. The total thickness of the black sheet according to Example 10 was 7.5 μm.

A black adhesive tape according to Example 10 was produced by the same method as for the black adhesive tape according to Example 8 except that the black sheet according to Example 8 in the black adhesive tape according to Example 8 was changed to the black sheet according to Example 10. The total thickness of the black adhesive tape according to Example 10 was 11.5 μm.

Comparative Example 1

A black sheet according to Comparative Example 1 was produced by the same method as for the black sheet according to Example 6 except that the color ink B of the black sheet according to Example 6 was changed to the black ink C, and the adhesive A was changed to the adhesive B. The total thickness of the black sheet according to Example 7 was 4.5 μm.

A black adhesive tape according to Comparative Example 1 was produced by the same method as for the black adhesive tape according to Example 6 except that the black sheet according to Example 6 in the black adhesive tape according to Example 6 was changed to the black sheet according to Comparative Example 1. The total thickness of the black adhesive tape according to Comparative Example 1 was 6.5 μm.

(Measurement of Glossiness Gu)

The glossiness Gu of each of the black sheets of Examples 1 to 10 and Comparative Example 1 and the black adhesive tapes of Examples 1 to 10 and Comparative Example 1 was measured from the matte layer side at a set angle of 60° by using MINOLTA Multi-Gloss 268 manufactured by KONICA MINOLTA, Inc. according to JIS Z 8741. The presence of the matte agent layer had no influence on the glossiness Gu, and the black sheet and the black adhesive tape of each of the examples showed the same measurement results. The results are shown in Table 12, Table 13, and Table 14.

(Measurement of CIE Color Values (L*, a*, b*))

With respect to the CIE color values (L*, a*, b*) of each of the black sheets of Examples 1 to 10 and Comparative Example 1 and the black adhesive tapes of Examples 1 to 10 and Comparative Example 1, the C spectrum was measured at 2° as a measurement reference from the matte layer side by using SPECTROPHOTOMETER CM-5 manufactured by KONICA MINOLTA, Inc. according to JIS Z 8722. The presence of the matte agent layer had no influence on the CIE color values, and the black sheet and the black adhesive tape of each of the examples showed the same measurement results. The results are shown in Table 12, Table 13, and Table 14.

(Measurement of Infrared Reflectance R at Wavelength of 850 nm)

The total reflectance of each of the black sheets of Examples 1 to 10 and Comparative Example 1 and the black adhesive tapes of Examples 1 to 10 and Comparative Example 1 were measured within any desired range including at least wavelengths of 800 to 900 nm by using Hitachi spectrophotomreter U-4100 manufactured by Hitachi, Ltd. and the value at a wavelength of 850 nm was reported. The presence of the adhesive layer had no influence on the infrared reflectance R, and the black sheet and the black adhesive tape of each example showed the same measurement results. The results are shown in Table 13, Table 14, and Table 15.

TABLE 13

|  |  | Example 1 | Example 2 | Example 3 | Example 4 | Example 5 |
|---|---|---|---|---|---|---|
| Thickness of matte layer (μm) |  | 1.5 | 1.5 | 1.5 | 1.5 | 1.5 |
| Black infrared reflecting layer | Pigment type | Organic | Organic | Organic | Organic | Organic |
|  | Thickness (μm) | 1.0 | 1.5 | 1.0 | 1.0 | 1.0 |
| Thickness of white infrared reflecting layer (μm) |  | — | — | 1.0 | 2.0 | 3.0 |
| Base sheet | Type | PET | PET | PET | PET | PET |
|  | Thickness (μm) | 3.5 | 3.5 | 3.5 | 3.5 | 3.5 |
| Total thickness of black sheet (μm) |  | 6.0 | 6.5 | 7.0 | 8.0 | 9.0 |
| Adhesive layer | Color | Transparent | Transparent | Transparent | Transparent | Transparent |
|  | Thickness (μm) | 2.0 | 2.0 | 2.0 | 2.0 | 2.0 |
| Total thickness of black adhesive tape (μm) |  | 8.0 | 8.5 | 9.0 | 10.0 | 11.0 |
| Glossiness Gu |  | 2.4 | 2.4 | 3.5 | 4.8 | 5.2 |
| L* value |  | 24.4 | 24.0 | 24.2 | 26.0 | 26.6 |
| a* value |  | 1.1 | 0.9 | 1.0 | 0.8 | −0.8 |
| b* value |  | −0.8 | −0.5 | −1.2 | −2.0 | −2.4 |
| R/% |  | 21.9 | 17.7 | 26.7 | 31.0 | 36.2 |

TABLE 14

|  |  | Example 6 | Example 7 | Example 8 |
|---|---|---|---|---|
| Thickness of matte layer (μm) |  | 1.5 | 1.5 | 1.5 |
| Black infrared reflecting layer | Pigment type | Inorganic | Inorganic | Inorganic |
|  | Thickness (μm) | 1.0 | 1.5 | 1.0 |
| Thickness of white infrared reflecting layer (μm) |  | — | — | 1.0 |
| Base sheet | Type | PET | PET | PET |
|  | Thickness (μm) | 2.0 | 2.0 | 2.0 |
| Total thickness of black tape (μm) |  | 4.5 | 5.0 | 5.5 |

TABLE 14-continued

|  | Example 6 | Example 7 | Example 8 |
|---|---|---|---|
| Adhesive layer Color | Transparent | Transparent | Transparent |
| Thickness (μm) | 2.0 | 2.0 | 2.0 |
| Total thickness of black adhesive tape (μm) | 6.5 | 7.0 | 7.5 |
| Glossiness Gu | 1.9 | 2.4 | 2.4 |
| L* value | 28.1 | 27.0 | 32.7 |
| a* value | −0.8 | −0.4 | −2.5 |
| b* value | −1.5 | −1.4 | −2.9 |
| R/% | 20.4 | 21.8 | 23.3 |

TABLE 15

|  | Example 9 | Example 10 | Comparative Example 1 |
|---|---|---|---|
| Thickness of matte layer (μm) | 1.5 | 1.5 | 1.5 |
| Black infrared Pigment type | Inorganic | Inorganic | Carbon |
| reflecting layer Thickness (μm) | 1.0 | 1.0 | 1.0 |
| Thickness of white infrared reflecting layer (μm) | 2.0 | 3.0 | — |
| Base sheet Type | PET | PET | PET |
| Thickness (μm) | 2.0 | 2.0 | 2.0 |
| Total thickness of black sheet (μm) | 6.5 | 7.5 | 4.5 |
| Adhesive layer Color | Transparent | Transparent | Black |
| Thickness (μm) | 2.0 | 2.0 | 2.0 |
| Total thickness of black adhesive tape (μm) | 8.5 | 9.5 | 6.5 |
| Glossiness Gu | 2.4 | 2.7 | 2 |
| L* value | 35.0 | 35.0 | 22.5 |
| a* value | −2.6 | −2.5 | 0.0 |
| b* value | −3.0 | −2.8 | −1.0 |
| R/% | 27.4 | 30.4 | 0~4 |

The CIE color values (L*, a*, b*) of the black sheet and the black adhesive tape of the present invention are approximate to those of the black sheet and the black adhesive tape of the comparative example using a usual carbon-based black ink, and thus even when together with a functional sheet and a black electronic component colored with a usual carbon-based black ink, the black sheet and the black adhesive tape are used for an electronic component in a small electronic terminal, designability is not impaired. In addition, although discrimination with visible light is difficult, discrimination can be made by using infrared light because of a large difference in infrared reflectance.

INDUSTRIAL APPLICABILITY

A black sheet and a black adhesive tape of the present invention can be used for adjusting the infrared reflectance of a plurality of functional sheets the same black color for an electronic component, such as a heat dissipation sheet, a magnetic sheet, an insulation sheet, and the like, which are used for a small electronic terminal.

REFERENCE SIGNS LIST

1 . . . black sheet, 2 . . . black adhesive tape, 11 . . . base sheet, 12 . . . infrared reflecting layer, 13 . . . black infrared reflecting layer, 14 . . . white infrared reflecting layer, 15 . . . matte layer, 16 . . . adhesive layer, 17 . . . infrared reflecting adhesive layer, 18 . . . infrared reflecting base sheet, 19 . . . release liner, 21 . . . infrared light source and infrared sensor, 22 . . . infrared reflecting coating film, 23 . . . absorbent

The invention claimed is:
1. A black sheet comprising a laminate of a base sheet and an infrared reflecting layer, the infrared reflecting layer comprising:
(a) an inorganic black pigment selected from the group consisting of chromium iron oxide, chromium iron nickel oxide, copper chromate, chromite, manganese ferrite, nickel manganese iron oxide, an infrared non-reflecting inorganic black pigment, and combination thereof;
(b) an inorganic color pigment selected from the group consisting of bismuth vanadate, chromium antimony titanate, chromium oxide, cobalt aluminate, cobalt chromate, cobalt chromium aluminate, cobalt lithium aluminate, cobalt titanate, iron chromate, iron chromium titanium, lead chromate, antimony manganese titanate, manganese titanate, nickel antimony titanate, nickel titanate, niobium tin pyrochlore, tin zinc, titanium oxide, zinc ferrite, zinc iron chromate, and an infrared non-reflecting inorganic color pigment;
(c) a resin; and
wherein the black sheet has the a CIE color values (L*, a*, b*) and the an infrared reflectance It/[%] at a wavelength of 850 nm,

$18 \leq L^* \cdot 36$ $-3 \leq a^* \leq 3$ $-3 \leq b^* \leq 3$ $12 \leq R.$

2. The black sheet according to claim 1, wherein the thickness of the base sheet is 0.5 to 100 μm, and the thickness of the infrared reflecting layer is 1 to 10 μm.

3. The black sheet according to claim 1, wherein the infrared reflecting layer further contains an organic black pigment.

4. The black sheet according to claim 1, wherein the infrared reflecting layer includes a laminate of a black infrared reflecting layer and a white infrared reflecting layer.

5. The black sheet according to claim 1, further comprising a matte layer laminated on the infrared reflecting layer,
wherein glossiness Gu measured at a set angle of 60° according to JIS Z 8741 is within the following respective range:

$0 \leq Gu \leq 10.$

6. The black sheet according to claim 1, wherein the black sheet is used for adjusting the infrared reflectance of a functional sheet for an electronic component.

7. The black sheet according to claim 6, wherein the functional sheet is a heat dissipation sheet, a magnetic sheet, or an insulation sheet.

8. A black adhesive tape comprising a laminate of the black sheet according to claim 1 and an adhesive layer.

9. The black adhesive tape according to claim 8, wherein the thickness of the adhesive layer is 1 to 50 μm.

10. The black sheet according to claim 1, further comprising:
(e) rheological functional additives containing a non-triblock copolymer dispersant, a defoaming agent, a matte agent, an adhesion promoter, a wax, and a curing agent,
wherein glossiness Gu measured at a set angle of 60° according to JIS Z 8741 is within the following respective range:

$0 \leq Gu \leq 10.$

11. The black sheet according to claim 1, wherein an ink for forming the infrared reflecting layer comprises:
   (a) greater than 0% and 50% or less of the inorganic black pigment;
   (b) greater than 0% and 30% or less of the inorganic color pigment;
   (c) 1 to 35% of the resin; and
   (d) 5 to 65% of a solvent.

12. The black sheet according to claim 10, wherein an ink for forming the infrared reflecting layer comprises:
   (a) greater than 0% and 50% or less of the inorganic black pigment;
   (b) greater than 0% and 30% or less of the inorganic color pigment;
   (c) 1 to 35% of the resin;
   (d) 5 to 65% of a solvent; and
   (e) 0 to 20% of the rheological functional additives.

\* \* \* \* \*